US010781047B2

(12) United States Patent
Warmoth et al.

(10) Patent No.: US 10,781,047 B2
(45) Date of Patent: Sep. 22, 2020

(54) AIR-SUPPORTED BELT CONVEYORS AND SYSTEMS AND METHODS OF USING SAME

(71) Applicant: Bruks Rockwood, LLC, Alpharetta, GA (US)

(72) Inventors: Francis J. Warmoth, Greenville, SC (US); Bengt Axel Nilsson, Atlanta, GA (US); Steven B. Bennett, Alpharetta, GA (US)

(73) Assignee: BRUKS ROCKWOOD, LLC, Alpharetta, GA (US)

( * ) Notice: Subject to any disclaimer, the term of this patent is extended or adjusted under 35 U.S.C. 154(b) by 0 days.

(21) Appl. No.: 16/332,933

(22) PCT Filed: Sep. 15, 2017

(86) PCT No.: PCT/US2017/051812
§ 371 (c)(1),
(2) Date: Mar. 13, 2019

(87) PCT Pub. No.: WO2018/053285
PCT Pub. Date: Mar. 22, 2018

(65) Prior Publication Data
US 2019/0248584 A1    Aug. 15, 2019

Related U.S. Application Data

(60) Provisional application No. 62/395,816, filed on Sep. 16, 2016.

(51) Int. Cl.
*B65G 15/60*    (2006.01)
*B65G 15/08*    (2006.01)

(52) U.S. Cl.
CPC ............. *B65G 15/60* (2013.01); *B65G 15/08* (2013.01)

(58) Field of Classification Search
CPC ................................ B65G 15/60; B65G 15/08
USPC ......................................................... 198/811
See application file for complete search history.

(56) References Cited

U.S. PATENT DOCUMENTS

| 2,692,041 A | 10/1954 | Campbell |
| 3,477,558 A | 11/1969 | Fleischauer |
| 3,627,111 A | 12/1971 | Hillinger |
| 3,734,270 A | 5/1973 | Foody |
| 3,734,271 A | 5/1973 | Dolgolenko et al. |
| 3,756,380 A | 9/1973 | Ackroyd et al. |
| 3,859,923 A | 1/1975 | Hamy |
| 3,889,802 A | 6/1975 | Jonkers |

(Continued)

FOREIGN PATENT DOCUMENTS

| AU | 2017326102 | 9/2017 |
| BR | 1120190050035 | 9/2017 |

(Continued)

OTHER PUBLICATIONS

U.S. Appl. No. 62/395,816, filed Sep. 16, 2016, Francis J. Warmoth.

(Continued)

*Primary Examiner* — Mark A Deuble
(74) *Attorney, Agent, or Firm* — Ballard Spahr LLP

(57) ABSTRACT

Disclosed herein are air-supported belt conveyors and independent conveyor subsystems that are selectively and independently designed to meet requirements that can change along the length of a conveyor, as well as from conveyor to conveyor.

30 Claims, 32 Drawing Sheets

(56) References Cited

U.S. PATENT DOCUMENTS

| | | | |
|---|---|---|---|
| 3,941,239 | A | 3/1976 | Hamy |
| 4,165,696 | A | 8/1979 | Chukhanov et al. |
| 4,185,736 | A | 1/1980 | Jonkers et al. |
| 4,289,230 | A | 9/1981 | McGee |
| 4,306,629 | A | 12/1981 | Powell |
| 4,483,770 | A | 11/1984 | Casey et al. |
| 4,489,825 | A | 12/1984 | Gladish |
| 4,550,823 | A | 11/1985 | Gladish |
| 4,579,320 | A | 4/1986 | Gladish |
| 4,595,501 | A | 6/1986 | Queyroix |
| 4,645,069 | A | 2/1987 | Sjogren |
| 4,687,079 | A | 8/1987 | Gladish |
| 4,838,169 | A | 6/1989 | Gladish |
| 4,984,681 | A | 1/1991 | Jonkers |
| 5,007,528 | A | 4/1991 | Hideharu |
| 5,042,646 | A * | 8/1991 | Beatty .................. B65G 15/08 198/811 |
| 5,396,071 | A | 3/1995 | Atwell et al. |
| 5,645,157 | A | 7/1997 | Kitano et al. |
| 5,829,577 | A | 11/1998 | Grisley |
| 5,865,299 | A | 2/1999 | Williams |
| 6,044,965 | A | 4/2000 | Clark |
| 6,062,377 | A | 5/2000 | Mensch |
| 6,170,644 | B1 | 1/2001 | Nakaegawa et al. |
| 6,232,287 | B1 | 5/2001 | Ruoslahti et al. |
| 6,491,156 | B1 | 12/2002 | Hudson |
| 6,630,633 | B1 | 10/2003 | Uber et al. |
| 6,966,430 | B2 | 11/2005 | Swinderman et al. |
| 6,971,508 | B2 | 12/2005 | Kotaki et al. |
| 7,006,665 | B2 | 2/2006 | Olson et al. |
| 7,281,624 | B2 | 10/2007 | Hartsuiker, Sr. et al. |
| 7,296,792 | B2 | 11/2007 | Kondratuk et al. |
| 7,299,917 | B2 | 11/2007 | Kotaki et al. |
| 7,325,673 | B2 | 2/2008 | Kotaki et al. |
| 7,741,435 | B2 | 6/2010 | Lappi et al. |
| 8,317,014 | B2 | 11/2012 | Hata et al. |
| 8,800,753 | B2 | 8/2014 | Kearney et al. |
| 2004/0118661 | A1 | 6/2004 | Swinderman et al. |
| 2015/0151925 | A1 | 6/2015 | Hudson |

FOREIGN PATENT DOCUMENTS

| | | | |
|---|---|---|---|
| CA | 3036566 | 9/2017 | |
| CN | 201793209 | 4/2011 | |
| CN | 202575209 | 5/2012 | |
| DE | 3527763 | 12/1987 | |
| EP | 0888992 A2 | 1/1999 | |
| EP | 0992440 A2 | 4/2000 | |
| EP | 1403195 A1 | 3/2004 | |
| EP | 17851617.5 | 9/2017 | |
| JP | H10316244 | 2/1998 | |
| JP | 2000118662 A | 4/2000 | |
| JP | 2019-515211 | 9/2017 | |
| JP | 2018131294 A * | 8/2018 | ............ B65G 15/60 |
| KR | 10-2019-7009908 | 9/2017 | |
| MX | MX/a/2019/002981 | 9/2017 | |
| RU | 2019111158 | 9/2017 | |
| VN | 1-2019-01682 | 9/2017 | |
| WO | WO-2011/117000 A1 | 9/2011 | |
| WO | PCT/US2017/051812 | 9/2017 | |
| WO | WO-2018/053285 A1 | 3/2018 | |
| ZA | PCT/US2017/051812 | 9/2017 | |

OTHER PUBLICATIONS

International Preliminary Report on Patentability dated Mar. 19, 2019 by the International Searching Authority for International Application No. PCT/US2017/051812, filed Sep. 15, 207 and published as WO 2018/053285 (Applicant—Bruks RockWood, LLC) (10 Pages).

International Search Report and Written Opinion dated Feb. 13, 2018 by the International Searching Authority for International Application No. PCT/US2017/051812, filed Sep. 15, 207 and published as WO 2018/053285 (Applicant—Bruks RockWood, LLC) (14 Pages).

European Search Report dated Apr. 22, 2020 for European Patent Application No. 17851617.5-1017/3512786 (Applicant—Bruks RockWood, LLC) (10 Pages).

Pltw: "Metal Fasteners, Joining, and Adhesives," Dec. 31, 2006, pp. 1-7. Retrieved from the internet URL:https://www.lancasterschools.org/cms/1ib/NY19000266/Centricity/Domain/1055/Metal Fasteners_Joining_Adhesives.pdf [retrieved on Mar. 31, 2020].

* cited by examiner

AIR-SUPPORTED BELT CONVEYORS AND SYSTEMS AND METHODS OF USING SAME

CROSS-REFERENCE TO RELATED APPLICATION

This is a U.S. National Phase Application of International Application No. PCT/US2017/051812, filed Sep. 16, 2017, which claims the benefit of U.S. Provisional Patent Application No. 62/395,816, filed Sep. 16, 2016, which applications are both incorporated herein by reference in their entirety.

FIELD

The disclosed invention relates to belt conveyor systems and methods and, more particularly, to air-supported belt conveyors and systems and methods of using same.

BACKGROUND

Conventional air-supported belt conveyors utilize a monolithic design comprising a unitized body with components that accomplish their own distinct functions. The cross-section is the same along the conveyor, except at terminals, and the entire cross-section forms a heavy weldment that functions as troughs, plenums, and structure. Consequently, the structure and air system cannot be practically optimized for actual span or discrete air supply requirements.

Moreover, the traditional approach has further undesirable consequences. Since testing and monitoring are difficult and by necessity deductive, scientific design of these systems is highly empirical and sometimes trial and error is necessary to get an air-supported belt conveyor operating when first installed. Current designs are often unreliable, and it is difficult to troubleshoot the source of unexpected resistances in the belt line.

Accordingly, there remains a need for air-supported belt conveyors that have independently designed systems that can function independently along a conveyor length. There is a further need for air-supported belt conveyors having independent systems that enable better testing, monitoring, control, power consumption, and maintenance of such devices and systems.

SUMMARY

Disclosed herein, in various aspects, is air-supported belt conveyor system having a longitudinal axis. The air-supported belt conveyor system can have a conveyor belt having a longitudinal length and a curved cross-sectional profile. The air-supported belt conveyor system can have a plurality of trough sections positioned along the longitudinal length of the conveyor belt. Each trough section can be positioned under the conveyor belt and define at least one opening for receiving air to support the conveyor belt above a top surface of each trough section. The air-supported belt conveyor system can have an air delivery subsystem. The air delivery subsystem can have at least one air supply line and a plurality of air manifolds positioned in fluid communication with the at least one air supply line. Each air manifold can contact a single trough section and be in fluid communication with at least one opening of the single trough section.

Optionally, the plurality of trough sections can comprise a plurality of curved trough sections positioned sequentially along the length of the conveyor belt. Each curved trough section can be formed to have a curvilinear profile within a reference plane. At least a portion of the plurality of curved trough sections can be positioned in sequence to define a curvature of at least a portion of the air-supported belt conveyor.

Kits comprising the components of the air-supported belt conveyor systems are also described.

Methods of using the disclosed air-supported belt conveyor systems are also described.

DESCRIPTION OF THE DRAWINGS

FIG. 1A is a perspective view of an exemplary air-supported belt conveyor system. FIG. 1B is a schematic diagram depicting the flow of material and the distribution of air within an exemplary air-supported belt conveyor system. FIG. 1C is an end view of an exemplary air-supported belt conveyor system, showing the connection of an air delivery subsystem to the conveying and return troughs of the system.

FIG. 2A is a side elevational view of the system. FIG. 2B is a bottom plan view of the system. FIG. 2C is a side perspective view of the system. FIG. 2D is a cross-sectional end view of the system, taken at section line A-A of FIG. 2A. FIG. 2E is a close-up bottom view of the conveying portion of the system, taken from line B-B of FIG. 2D. FIG. 2F is a close-up perspective view of individual trough sections of the conveying and return portions of the system. FIG. 2G is a close-up cross-sectional view of the connection between a manifold and a trough section, taken at section line C-C of FIG. 2A. FIG. 2H is a cross-sectional view of an exemplary connection between a manifold and a trough section, taken at an opening through the trough section that is in fluid communication with the manifold.

FIG. 3A is a side elevational view of the system. FIG. 3B is a bottom plan view of the system. FIG. 3C is a side perspective view of the system. FIG. 3D is a cross-sectional end view of the system, taken at section line D-D of FIG. 3A. FIG. 3E is a close-up bottom view of the conveying portion of the system, taken from line E-E of FIG. 3D. FIG. 3F is a close-up perspective view of individual trough sections of the conveying and return portions of the system.

FIG. 4A is a side elevational view of the system. FIG. 4B is a side perspective view of the system. FIG. 4C is a cross-sectional end view of the system, taken at section line G-G of FIG. 4A. FIG. 4D is a close-up bottom view of the conveying portion of the system, taken from line H-H of FIG. 4C. FIG. 4E is a close-up perspective view of individual trough sections of the conveying and return portions of the system.

FIGS. 5A-5B depict an exemplary joint having a flange as disclosed herein. FIG. 5A is a bottom view of the joint, while FIG. 5B is a cross-sectional view of the joint, taken along section line J-J of FIG. 5A. FIGS. 5C-5D depict an exemplary joint having a band as disclosed herein. FIG. 5C is a bottom view of the joint, while FIG. 5D is a cross-sectional view of the joint, taken along section line K-K of FIG. 5C. FIGS. 5E-5F depict an exemplary joint having a saddle as disclosed herein. FIG. 5E is a bottom view of the joint, while FIG. 5F is a cross-sectional view of the joint, taken along section line L-L of FIG. 5E.

DETAILED DESCRIPTION

Figure 1A:
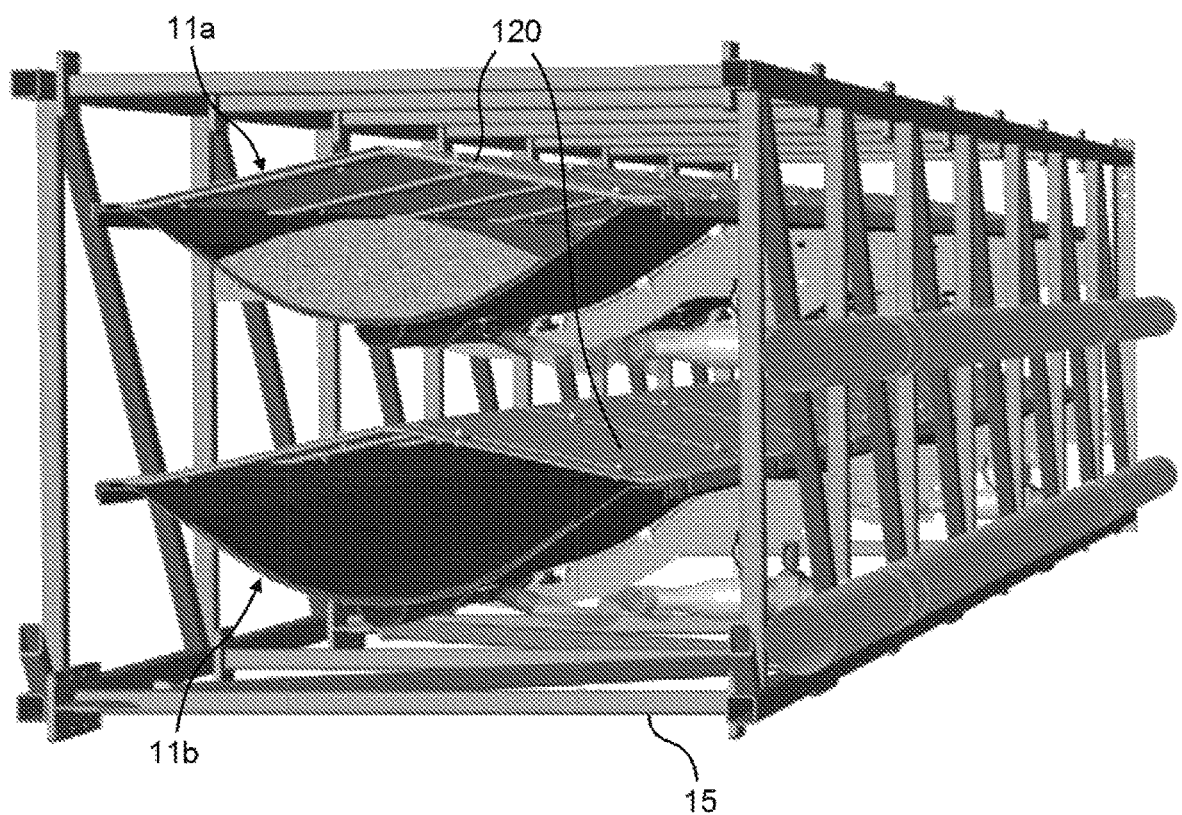
FIGS. 1A-1C depict the general arrangement of the disclosed air-supported belt conveyor systems.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "a valve" can refer to one or more of such valves.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Disclosed herein, in various aspects and referring to FIGS. 1A-13, are air-supported belt conveyors and independent conveyor subsystems that can be independently designed for requirements that can change along a conveyor length, as well as from conveyor to conveyor. As further disclosed herein, conventional air-supported belt conveyors pressurize a conveyor-length sealed chamber under troughs that in turn acts as a plenum with orifices opening beneath the belt. The plenum cross-section must be sufficient for all of the airflow from the fan down the length of the conveyor. This method cannot be discretely controlled and has other negatives. As further described herein, the disclosed systems and methods can direct the airflow from the fan down a trunk line that branches over to discrete manifolds, with each manifold having a limited number of orifices. The manifolds can be much smaller than the plenum in cross-section because most of the airflow is in the trunk line.

In one aspect, the disclosed systems can comprise covers that are separate from a trough. The covers can be removable and can also comprise various materials, including without limitation, steel, aluminum, plastic, reinforced plastic, and fiberglass. In another aspect, a top section of "conveying" troughs can support the belt and convey material between cross members of a span structure (truss) or floor supported frames. In exemplary aspects, the top trough sections are not part of the overall span structure, so they can comprise a non-structural member that can comprise a composite material, a thin gauge material, or combinations thereof. In a further aspect, a bottom section of "return" troughs can support the return belt between cross members of the span structure (truss) or floor supported frames. In exemplary aspects, the bottom trough sections are also not a part of the overall span structure, so they can comprise non-structural member that can comprise a composite material, a thin gauge material, or combinations thereof. In still a further aspect, an air supply system can comprise a trunk line that can be fed by one or more fans, with branches spaced along its length that can supply air to channels (manifolds) under the line or lines of orifices under each trough section. Branch spacing and the air channel (manifold) cross-section can be optimized based on various factors. In even further aspects, the system can comprise a support structure that can vary along the conveyor to ensure optimal sizing. Along floors or grade, cross supports can extend to grade. When elevated, trusses or other spanning structures can support cross frames for each trough section.

Exemplary Conveyor Systems

Figure 1B:
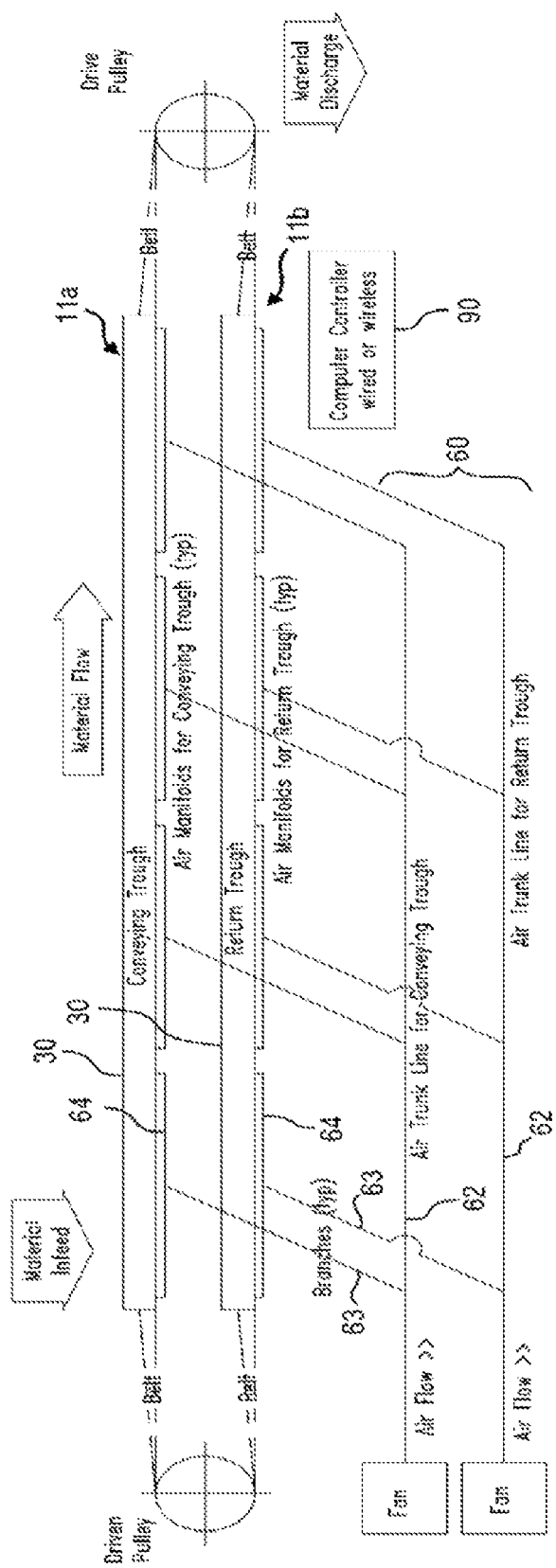
Figure 1C:
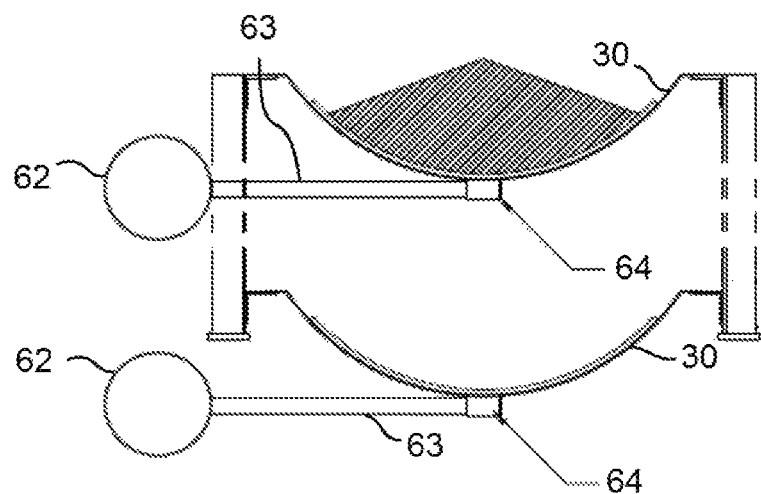

In exemplary aspects, and with reference to FIGS. 1A-13, the air-supported belt conveyor system 10 can have a longitudinal axis 12 and a transverse axis 16, both of which can be perpendicular to a vertical axis 14. As shown in FIG. 1A, the air-supported belt conveyor system 10 can comprise a "carrying" or "conveying" conveyor assembly 11a and a "return" conveyor assembly 11b, with the "return" conveyor assembly typically being positioned underneath the "carrying" conveyor assembly. A continuous loop conveyor belt 20 can be driven by pulleys at opposing ends of the conveyor system. In use, and as schematically depicted in FIG. 1B, the portion of the belt 20 within the "carrying" conveyor can receive material 200 from an feed source (e.g., a hopper) and transport the material in a first direction until reaching a drive pulley, at which point the direction of movement of the belt is reversed and the material on the belt is discharged. Thus, it is contemplated that portions of the belt within the "return" conveyor will be advanced in a second direction opposite the first direction relative to the longitudinal axis 12. During operation, air can be provided underneath the belt such that the belt "floats" within the respective conveyor assemblies.

Figure 2A:
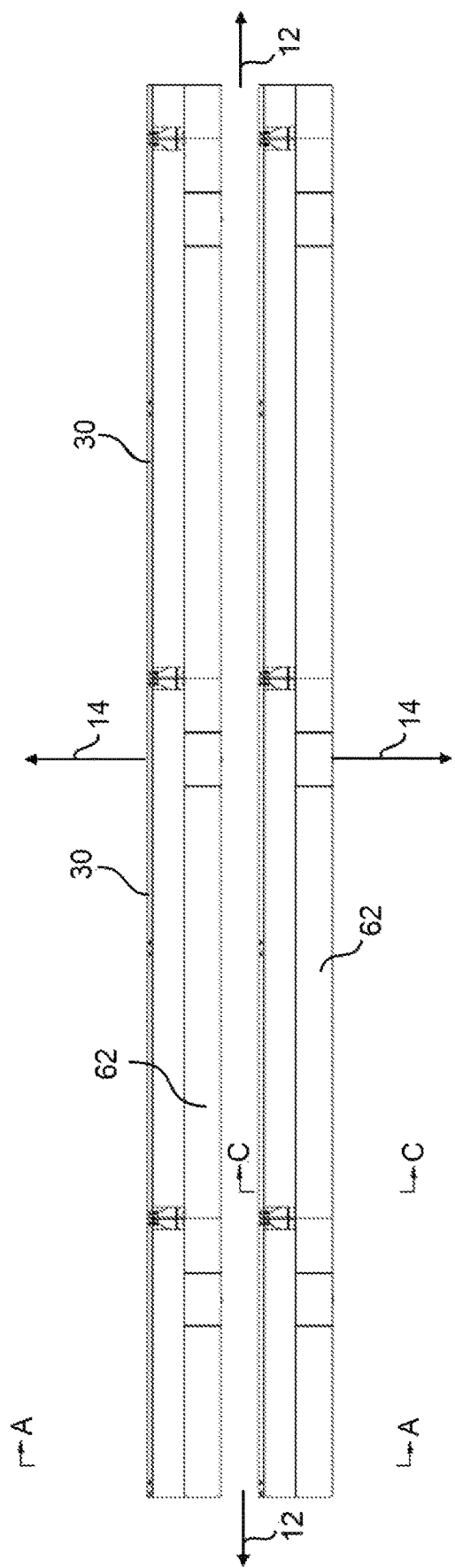
FIGS. 2A-2H provide various views of an exemplary air-supported belt conveyor system having conveying and return conveyors with trough sections that are connected together by saddles as further disclosed herein, with each trough section being provided with a respective manifold for providing air to the belt within the trough section.
Figure 2B:
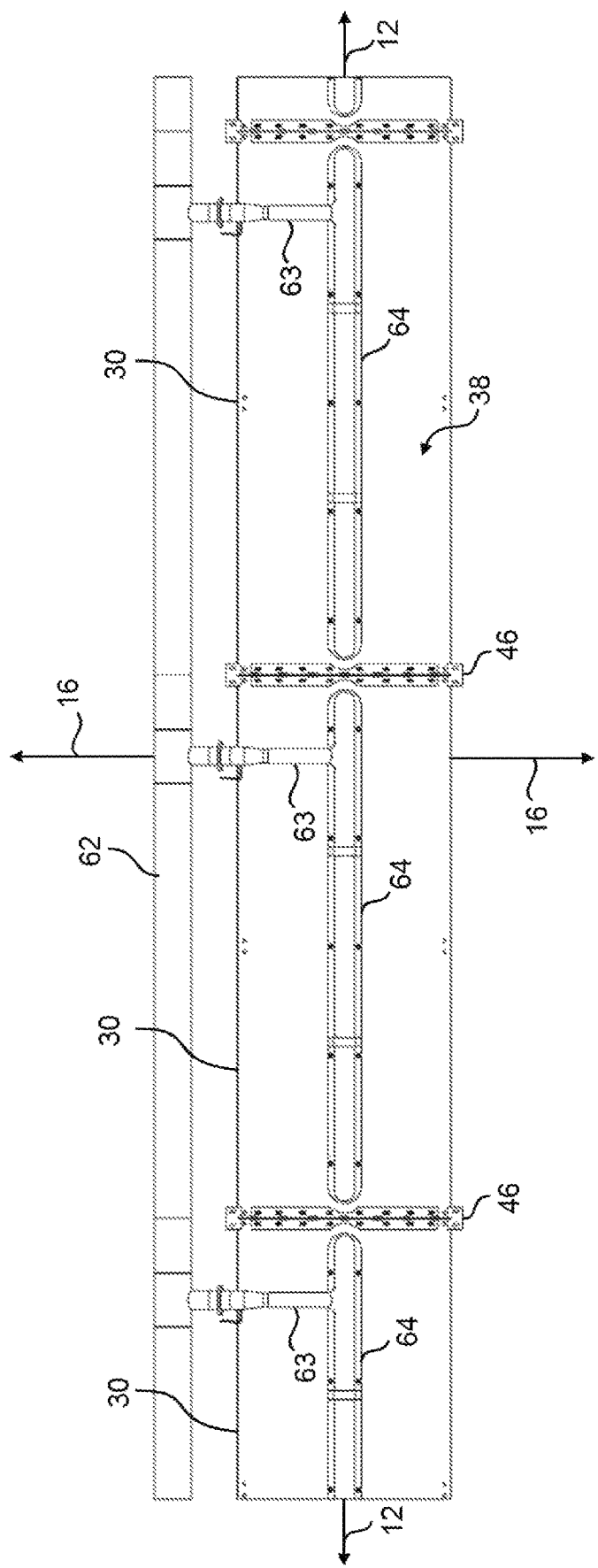
Figure 2C:
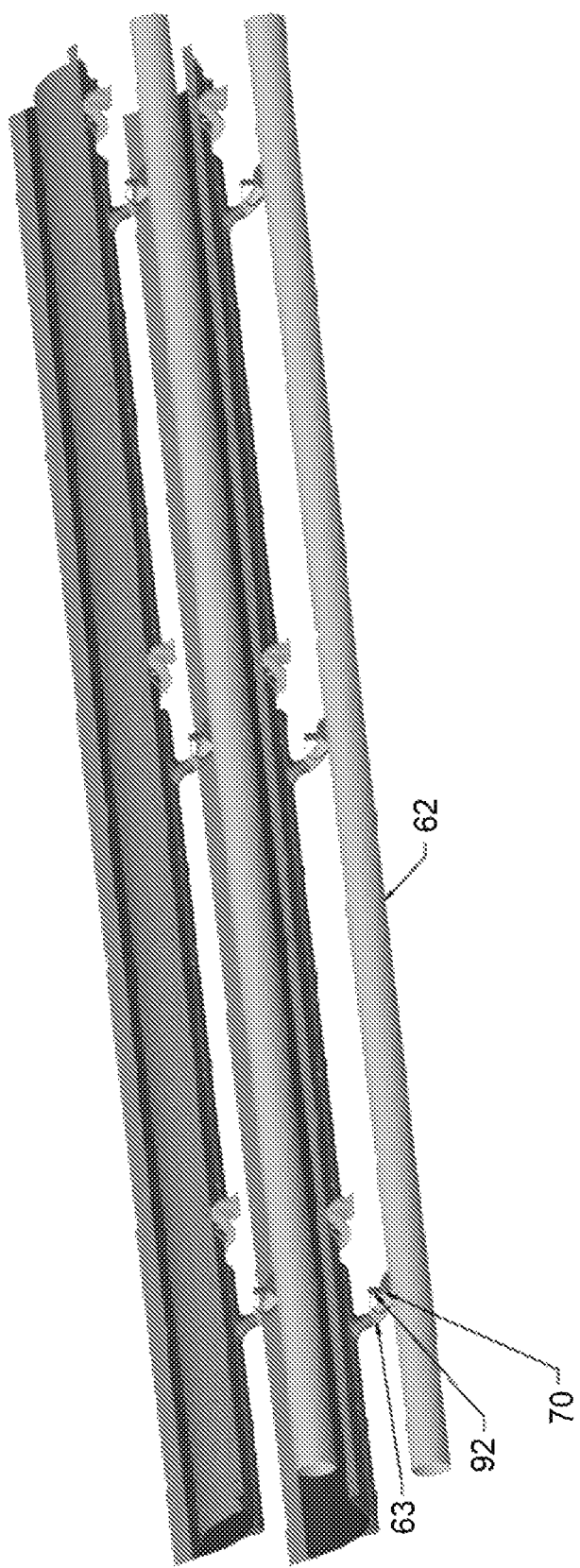
Figure 2D:
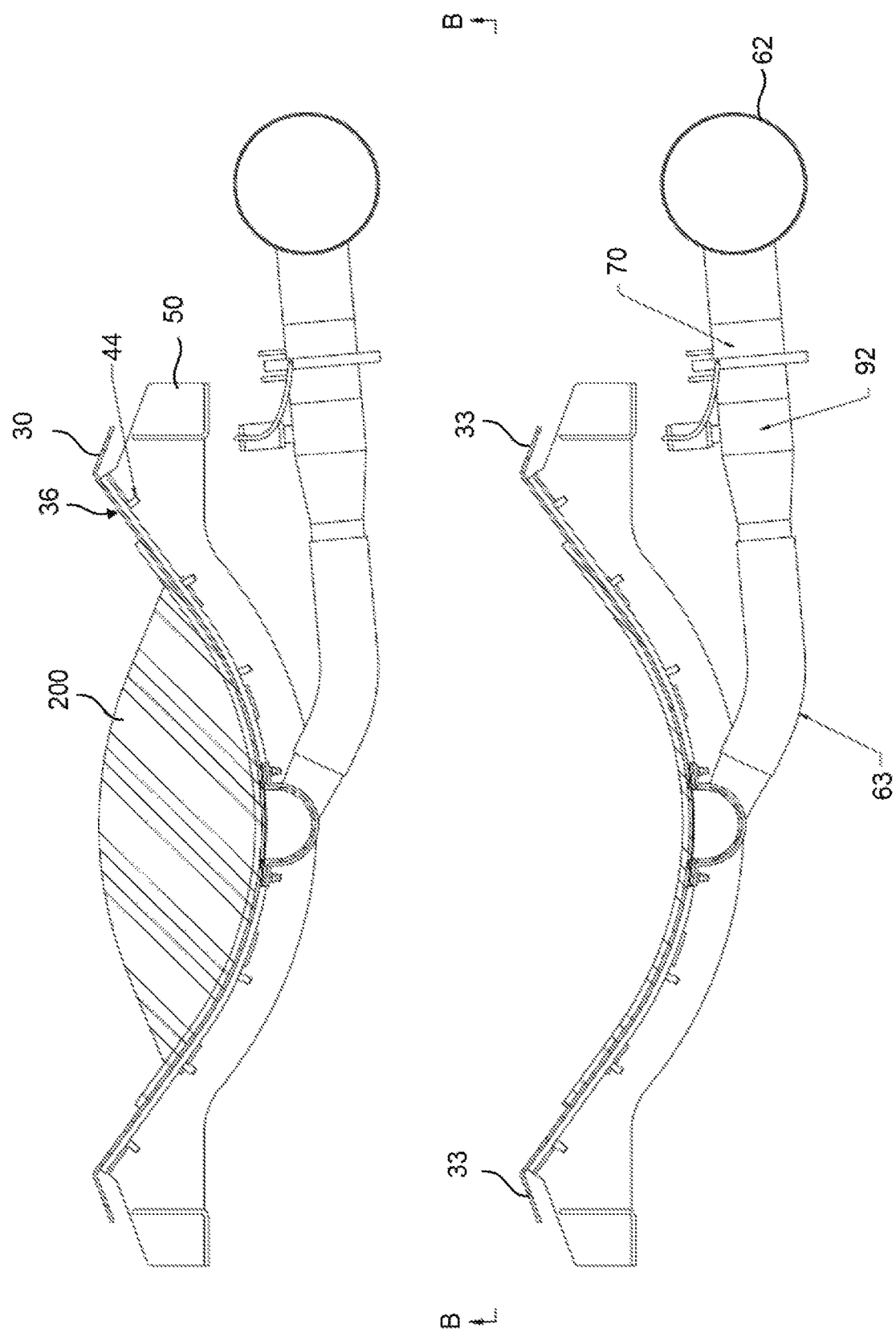

It is contemplated that the exemplary conveyor/trough configurations disclosed herein can be applied to either or both the "conveying" portion and the "return" portion of the system. Thus, when the disclosed systems are described below, it is understood that the described configurations can be applicable to only the "conveying" portion of the system, only the "return" portion of the system, or both the "conveying" and "return" portions of the system. In exemplary aspects, the belt 20 can have a longitudinal length and a curved cross-sectional profile (when viewed within a plane perpendicular to the longitudinal axis 12 as shown, for example, in FIG. 2G and FIGS. 5B, 5D, and 5F). The conveyor system 10 can further comprise a plurality of trough sections 30 positioned along the longitudinal length of the conveyor belt 20. Each trough section 30 can be positioned under the conveyor belt 20 and define at least one opening 32 for receiving air to support the conveyor belt above a top surface 36 of each trough section 30. Each trough section 30 can comprise opposed flange portions 33 that are angularly oriented relative to the curved portion of the trough section as shown in FIG. 2D. The conveyor system can further comprise an air delivery subsystem 60 having at least one air supply line 62 positioned in fluid communication with an air or fluid source and a plurality of air manifolds 64 positioned in fluid communication with the at least one air supply line 62. As depicted in FIGS. 1A-4E, each air manifold 64 contacts a single trough section 30 and is in fluid communication with at least one opening 32 of that single trough section 30. In some aspects, and in contrast to conventional belt conveyor systems, the trough sections 30 and the air delivery subsystem 60 do not form a continuous air chamber such that adjacent trough sections 30 of the plurality of trough sections of the disclosed system 10 are not sealingly connected. More particularly, in some optional aspects, it is contemplated that the disclosed system 10 does not comprise an air pocket extending continuously between the plurality of trough sections and the conveyor belt along the longitudinal length of the conveyor belt. Thus, in some aspects, it is further contemplated that the disclosed manifolds 64 do not span across adjacent trough sections.

In further aspects, the air delivery subsystem 60 can further comprise a plurality of flow control valves 70. Each flow control valve 70 can be positioned in fluid communication with a respective air manifold 64 and the at least one air supply line 62. In use, it is contemplated that each flow control valve 70 can be configured to permit selective adjustment of air flow to the air manifold 64 from the at least one air supply line 62.

In additional aspects, the system 10 can comprise a processor 90 communicatively coupled to each flow control valve 70 and configured to adjust a position of each flow control valve to selectively control delivery of air to the at least one opening 32 of each respective trough section 30 through the plurality of air manifolds 64 and thereby support the conveyor belt 20. In these aspects, it is contemplated that the processor 90 can be provided as a component of a computing device, such as a desktop computer, a laptop computer, a tablet, a smartphone, or a cloud-based computing device as are known in the art. Optionally, the processor 90 can be in communication with a memory or database (provided locally or remotely through a network, such as a cloud-based network) that can store operational protocols and parameter settings to be accessed by the processor. In further aspects, the processor 90 can be in communication with a user interface that allows for selective operator control of the air supply within the system.

In exemplary aspects, and as shown in FIGS. 1A-4E, the air delivery subsystem 60 can further comprise a plurality of branch conduits 63. In these aspects, each branch conduit 63 can extend between the at least one air supply line 62 and a respective air manifold 64. In exemplary aspects, the branch conduits 63 can comprise flexible hoses as are known in the art. Optionally, in some aspects, each flow control valve 70 can be positioned in fluid communication with a respective branch conduit 63. Alternatively, or additionally, in some aspects, and with reference to FIG. 9, the at least one air supply line can comprise a primary air supply line 62, and a plurality of flow control valves 70 can be positioned in line with the primary air supply line. In these aspects, the plurality of flow control valves 70 can divide the primary air supply line 62 into a plurality of flow control zones 100, with at least one air manifold 64 of the plurality of air manifolds being positioned in fluid communication with the primary air supply line 62 within each flow control zone. In further aspects, it is contemplated that each flow control zone 100 can include at least one trough section. Optionally, in these aspects, at least one flow control zone 100 can include a plurality of trough sections 30 (and thus, a plurality of manifolds).

In further aspects, the system 10 can further comprise a plurality of sensors 92 that are communicatively coupled to the processor 90. Optionally, in these aspects, each sensor 92, or a portion of the plurality of sensors 92, can be positioned in fluid communication with a respective branch conduit 63. Alternatively, or additionally, a plurality of sensors 92 can be positioned in line with a primary air supply line 62. In exemplary aspects, it is contemplated that each sensor 92 can be selected from the group consisting of a pressure sensor and a flow sensor.

In exemplary aspects, the plurality of sensors 92 can comprise sensors that are configured to produce an output indicative of a fluid pressure and/or flow rate within a corresponding, respective branch conduit 63 (or within a primary air supply line 62). In these aspects, the processor 90 can be configured to receive the output from the sensor 92 and to selectively adjust air flow to the manifold 64 positioned in fluid communication with the corresponding branch conduit 63 (or with the corresponding flow control zone of a primary air supply line). In response to receipt of the output from the sensor 92 positioned in fluid communication with a respective branch conduit 63 (or flow control zone), the processor 90 can be configured to adjust the position of the flow control valve (from open to closed or from closed to open or from fully open or closed to partially open or closed) positioned in fluid communication with the branch conduit (or flow control zone) to thereby adjust air flow to the corresponding manifold 64. In exemplary aspects, it is contemplated that each sensor 92 disclosed herein can comprise a pressure sensor, a flow sensor, or combinations thereof. In these aspects, it is contemplated that any conventional sensor for directly or indirectly measuring pressure or flow within a conduit can be used within the disclosed system. Particular examples of sensors that are suitable for this purpose are well known in the art and will not be described in detail herein.

In use, it is contemplated that the processor 90 can be configured to selectively adjust the flow of air within a respective branch conduit to thereby control the delivery of air to a particular manifold. For example, in some aspects, it is contemplated that the processor 90 can be configured to adjust the flow rate of air within a first branch conduit such that the flow rate of air within first branch conduit is greater or less than the flow rate within a second branch conduit, which can either be positioned in communication with the same manifold or a different manifold as the first branch conduit.

In exemplary aspects, it is contemplated that the processor 90 can be configured to produce effective air flow rates for each respective trough section. In these aspects, it is contemplated that the air flow rate for at least one trough section can be greater or less than the effective air flow rate of at least one other trough section, thereby permitting adjustment in the pressurization and support provided by the air between each respective trough section and the portion of the belt positioned above that trough section.

In use, it is further contemplated that the processor 90 can be configured to selectively adjust the flow of air within each respective flow zone (where provided). For example, in some aspects, it is contemplated that the processor 90 can be configured to adjust the flow rate of air within a first flow zone such that the flow rate of air within the first flow zone is greater or less than the flow rate within a second flow zone.

Figure 2E:
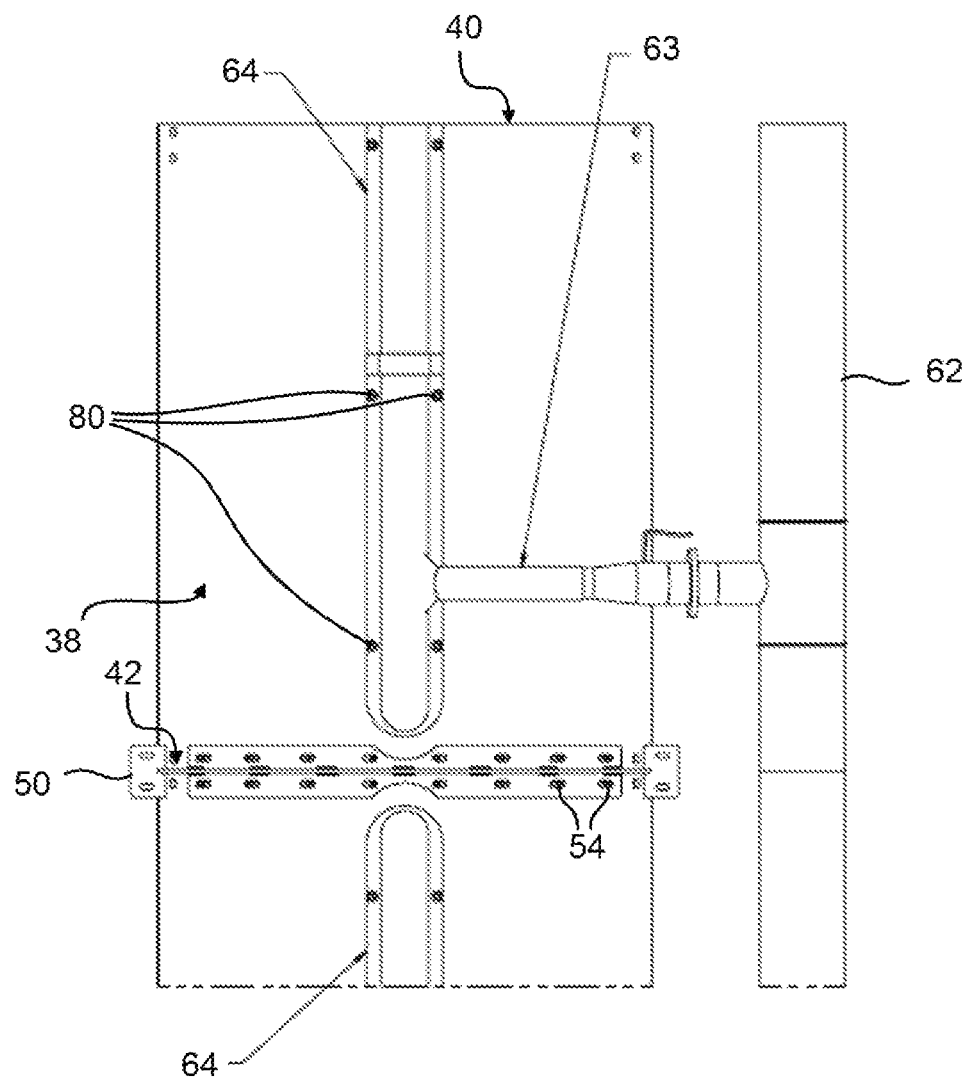
Figure 2F:
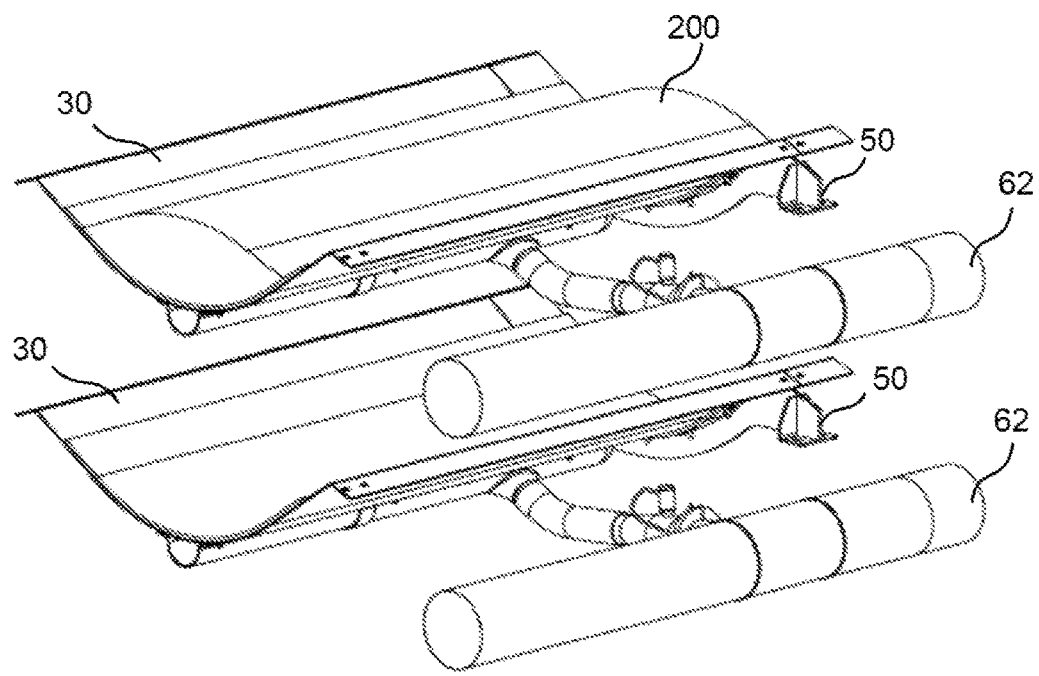
Figure 2G:
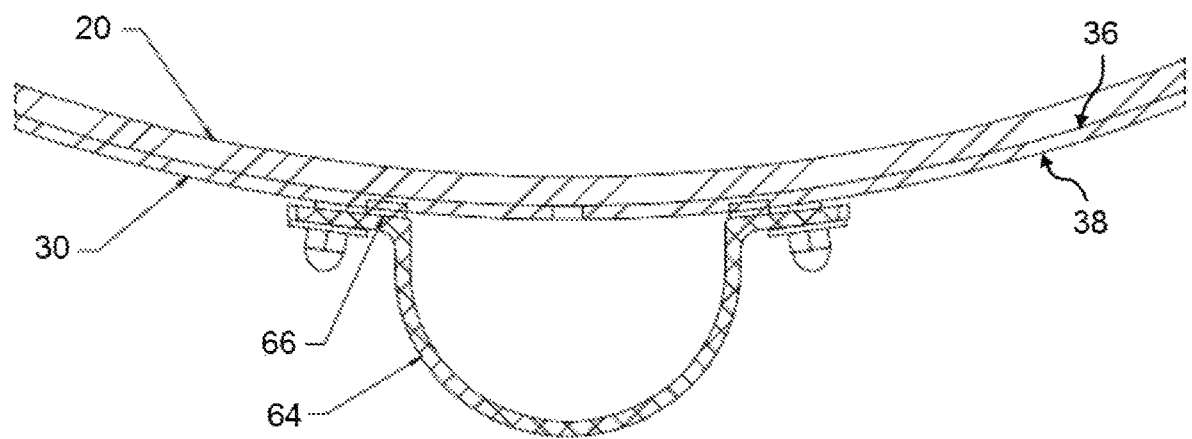
Figure 2H:
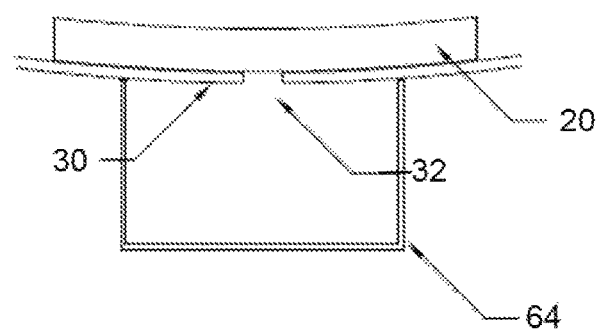
Figure 2I:
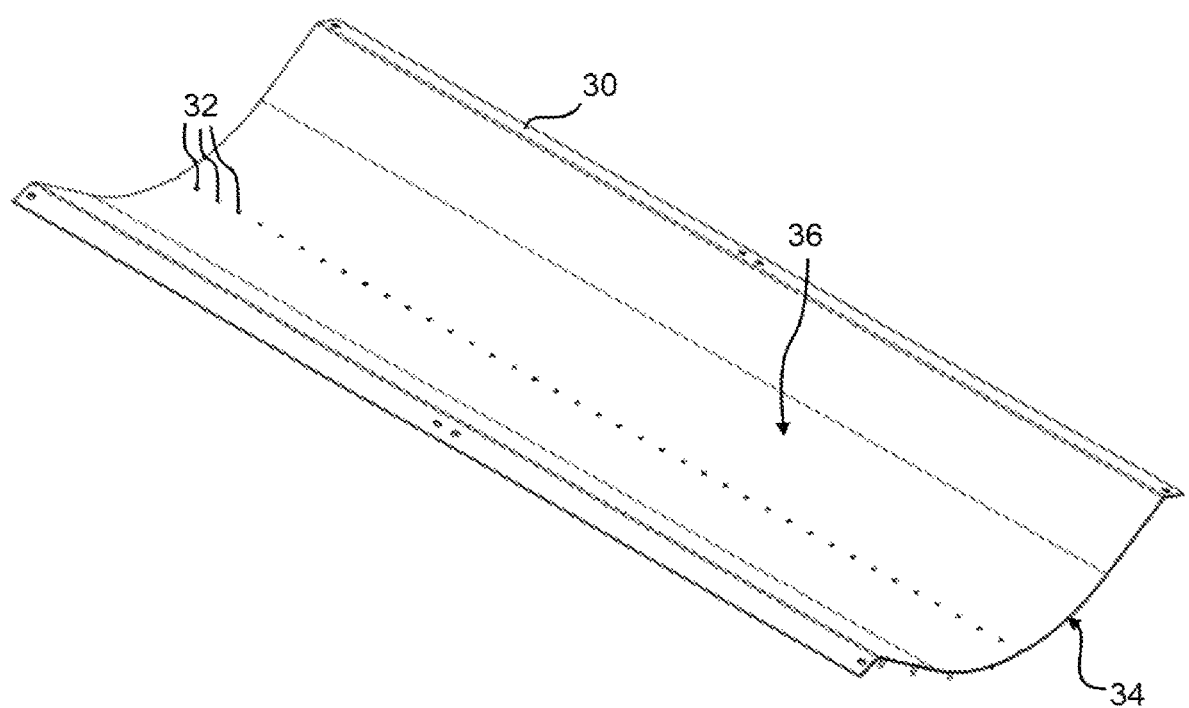
FIG. 2I is an isolated, top perspective view of an exemplary trough section having a row of openings as disclosed herein.
Figure 3A:
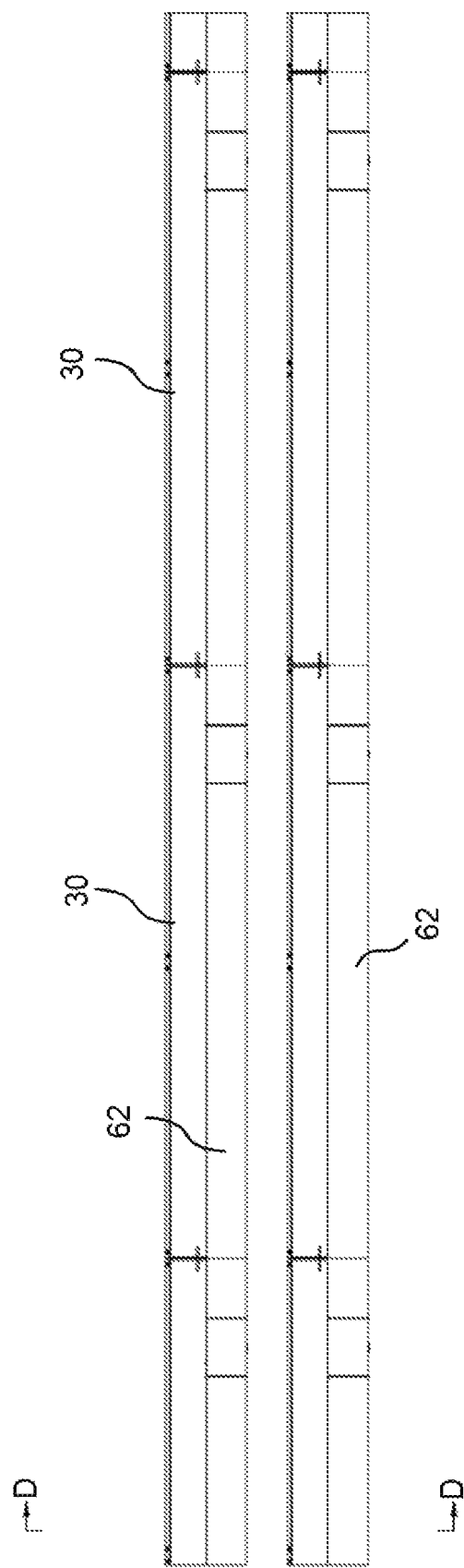
FIGS. 3A-3F provide various views of an exemplary air-supported belt conveyor system having conveying and return conveyors with trough sections that are connected together by flanges as further disclosed herein, with each trough section being provided with a respective manifold for providing air to the belt within the trough section.
Figure 3B:
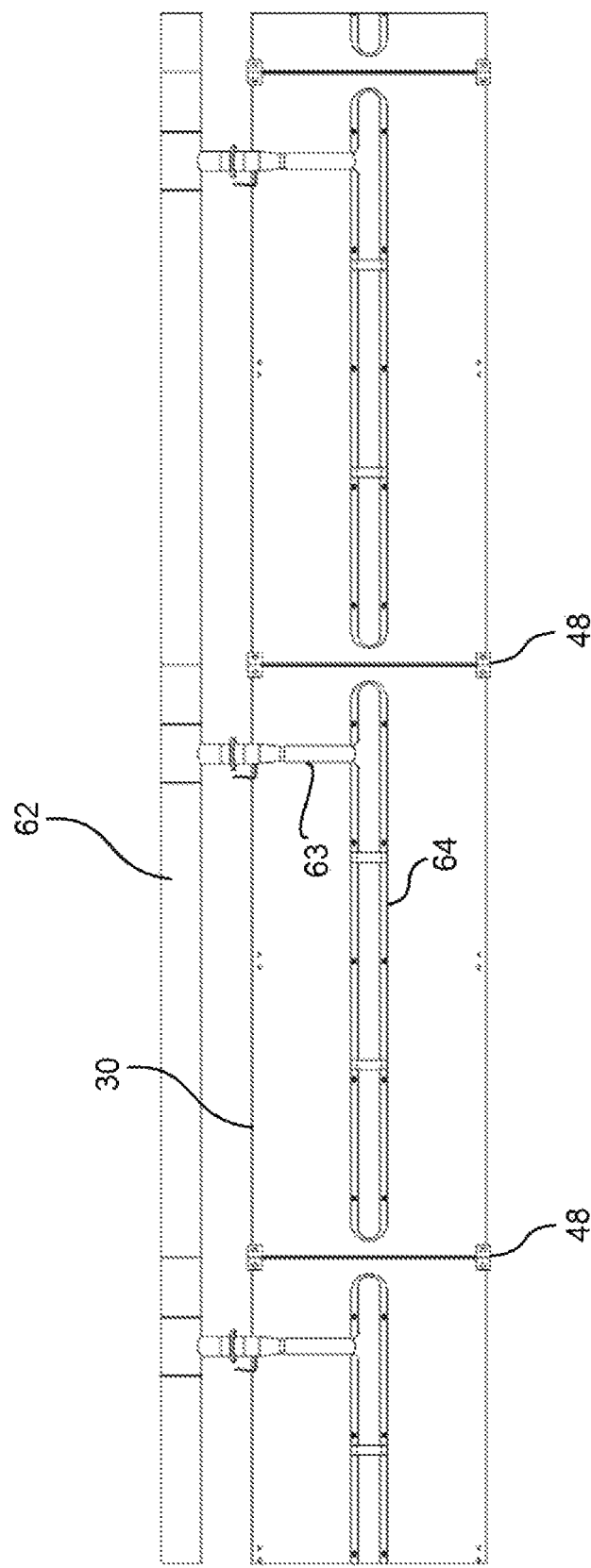
Figure 3C:
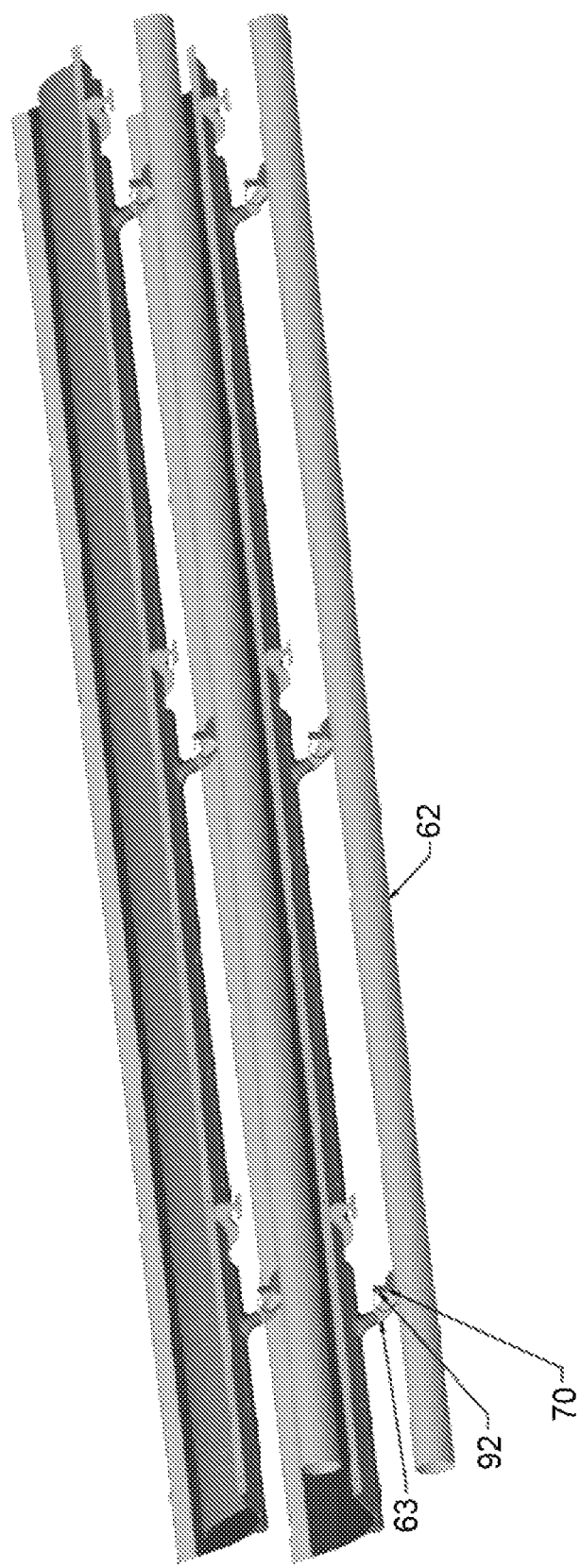
Figure 3D:
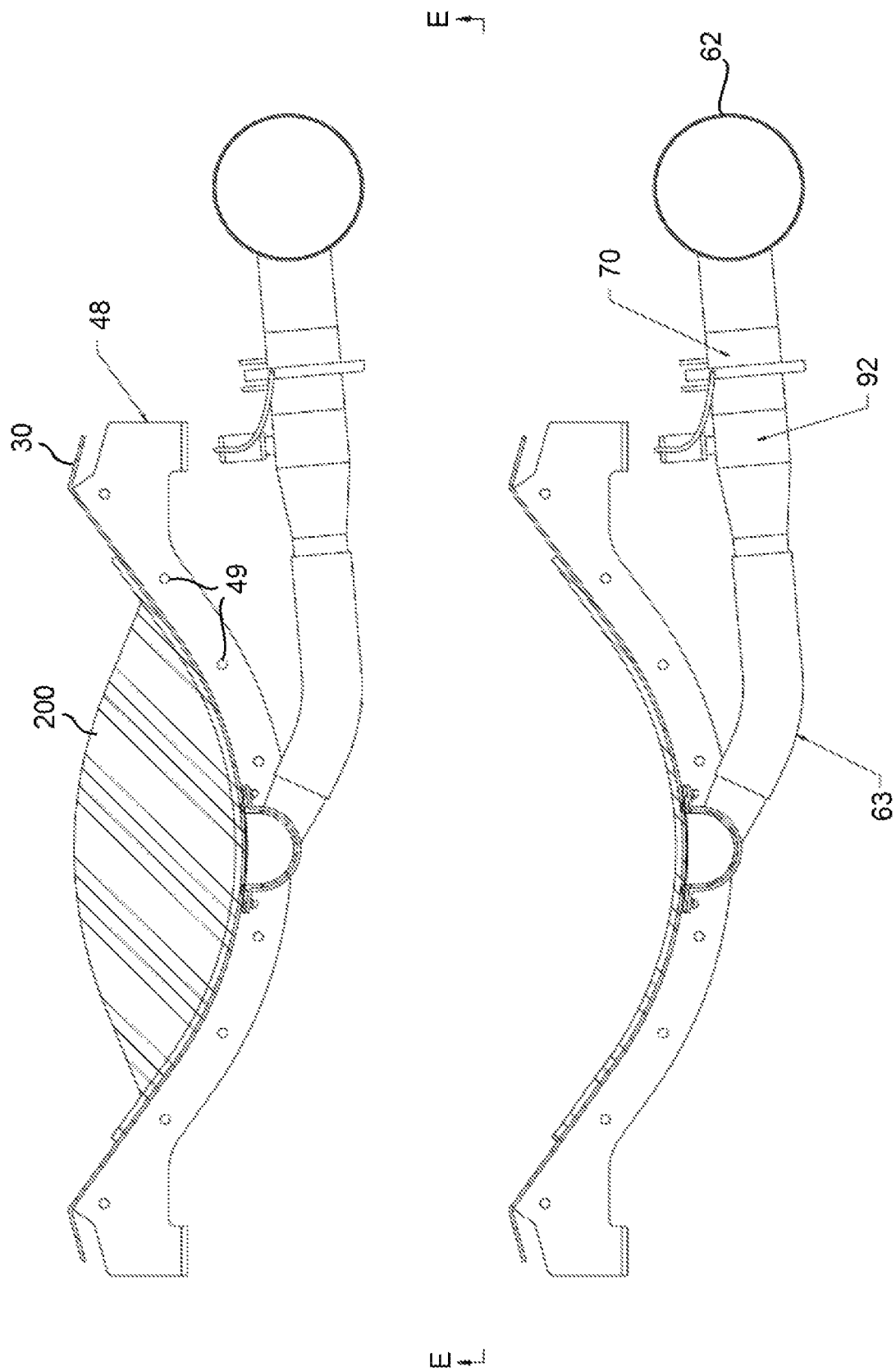
Figure 3E:
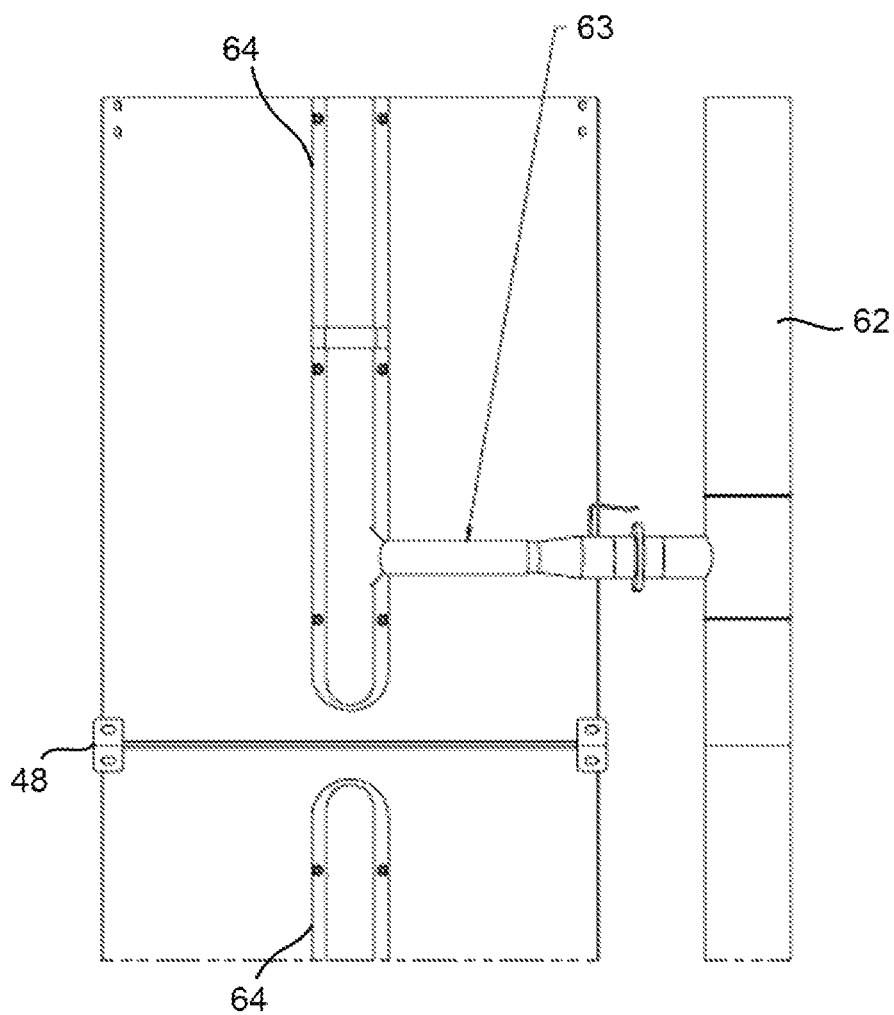
Figure 3F:
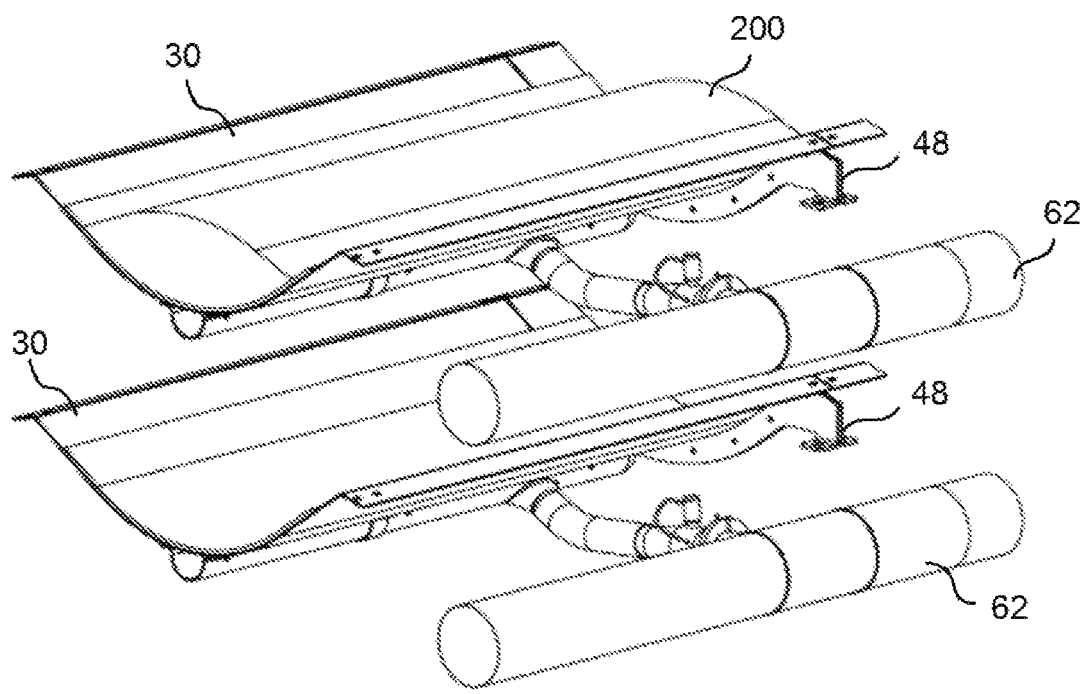
Figure 4A:
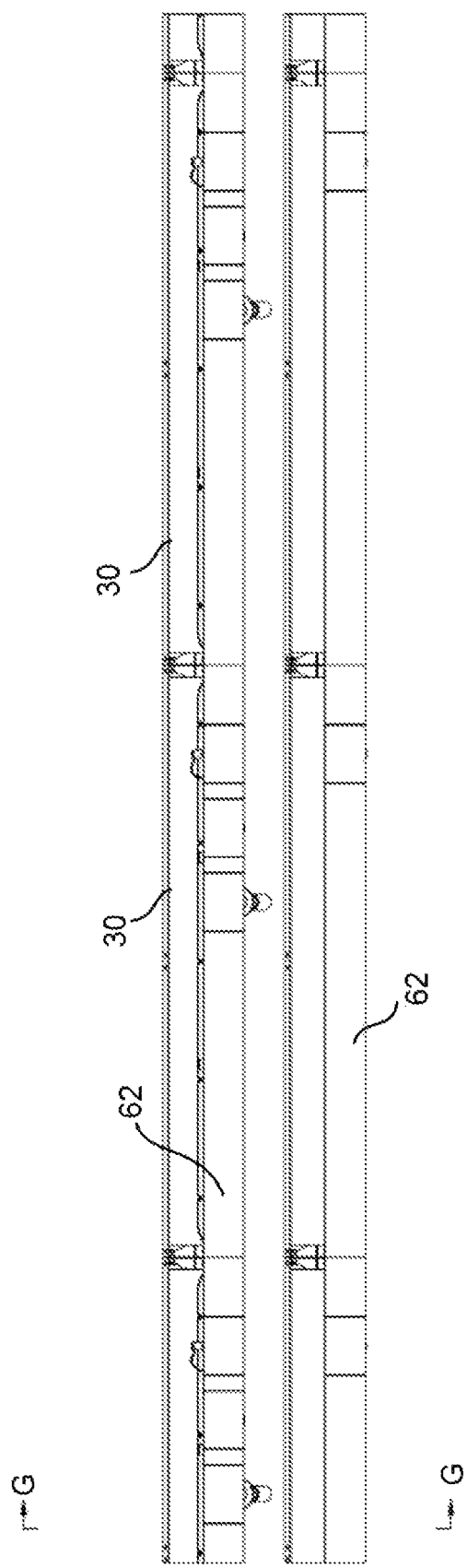
FIGS. 4A-4E provide various views of an exemplary air-supported belt conveyor system having conveying and return conveyors with trough sections that are connected together by saddles as further disclosed herein, with at least some trough sections being provided with multiple manifolds for providing air to the belt within the trough section.
Figure 4B:
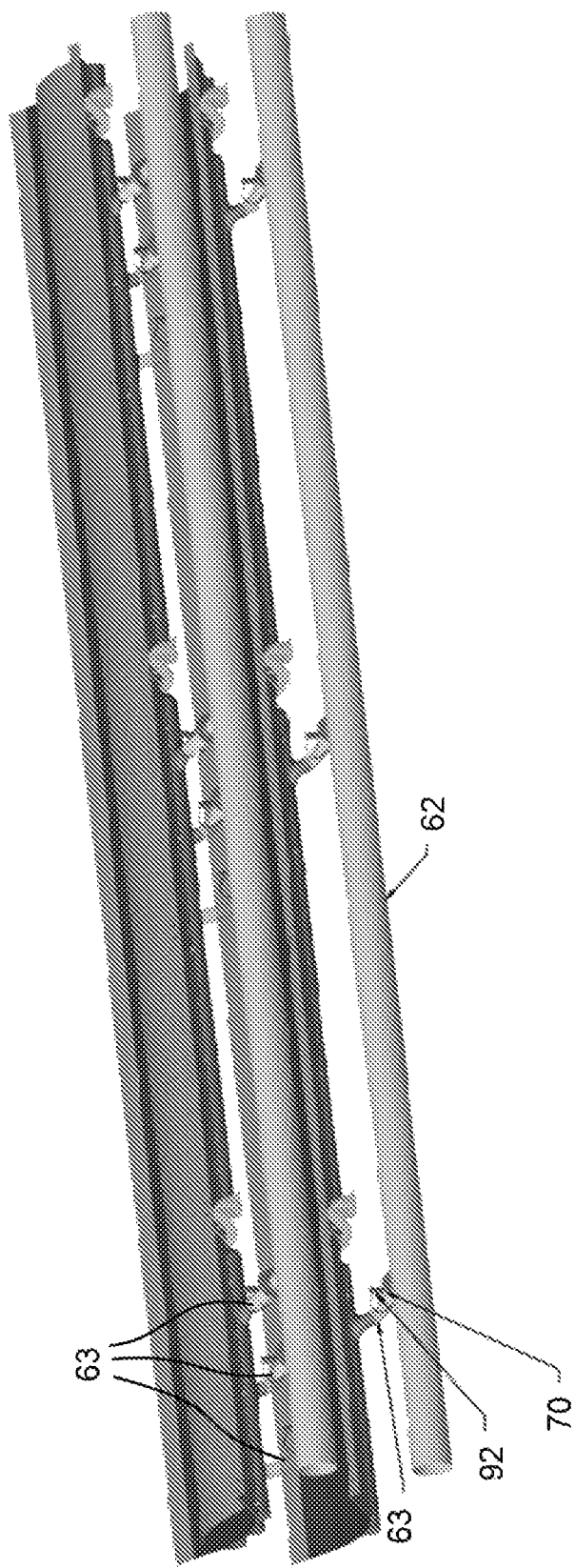
Figure 4C:
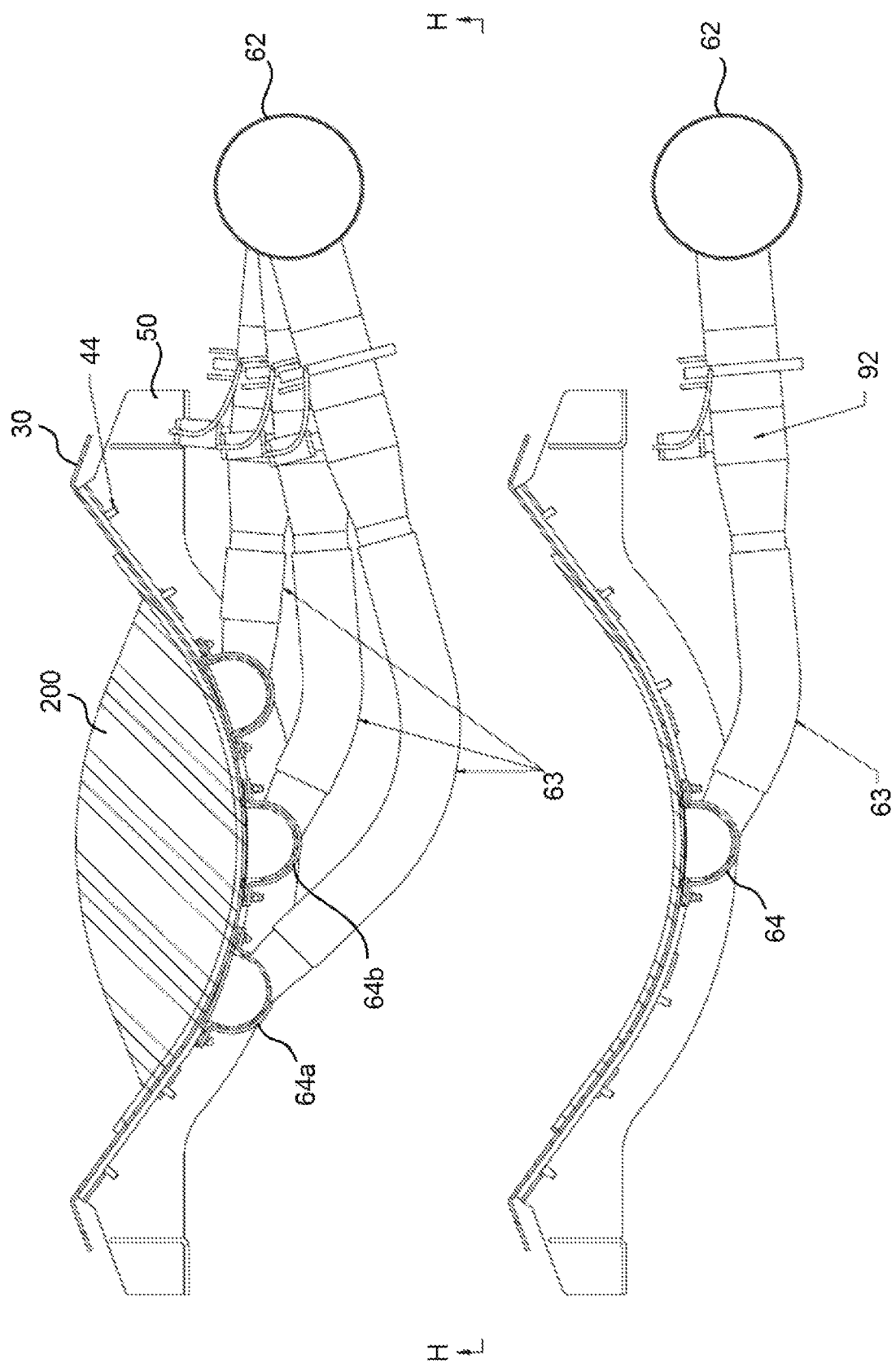
Figure 4D:
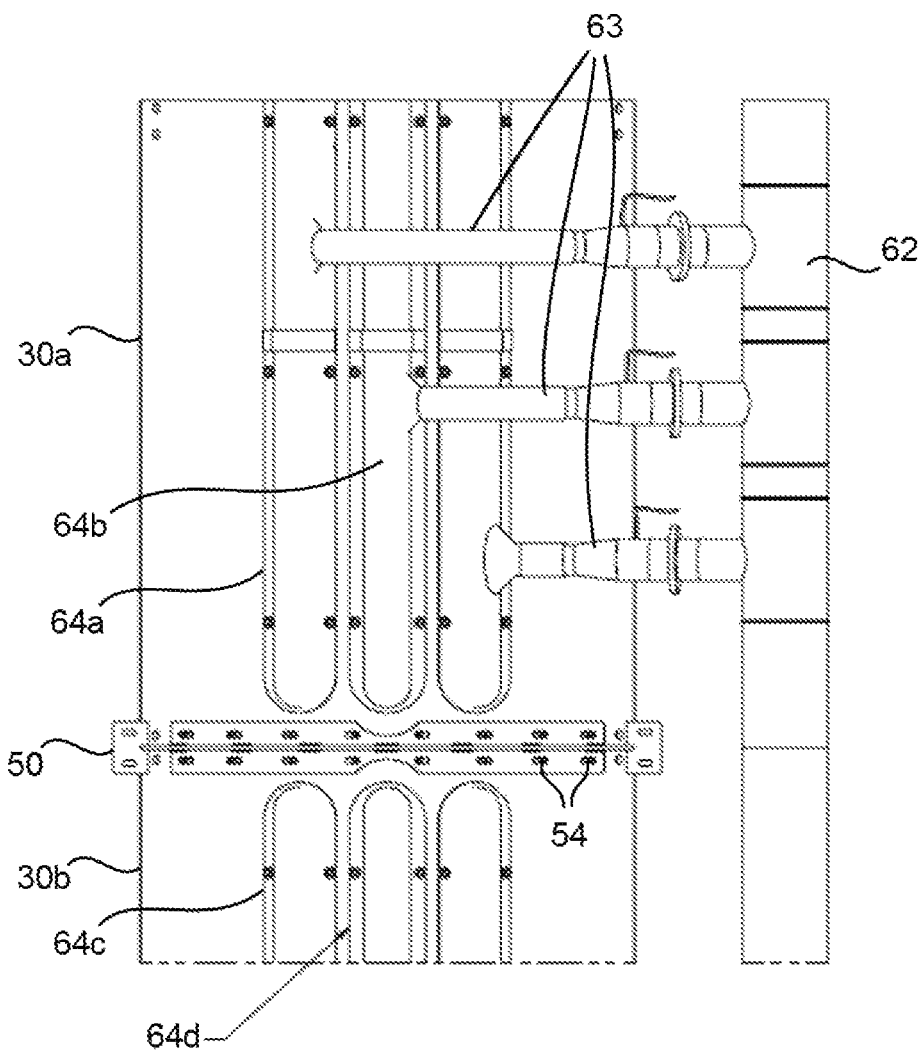
Figure 4E:
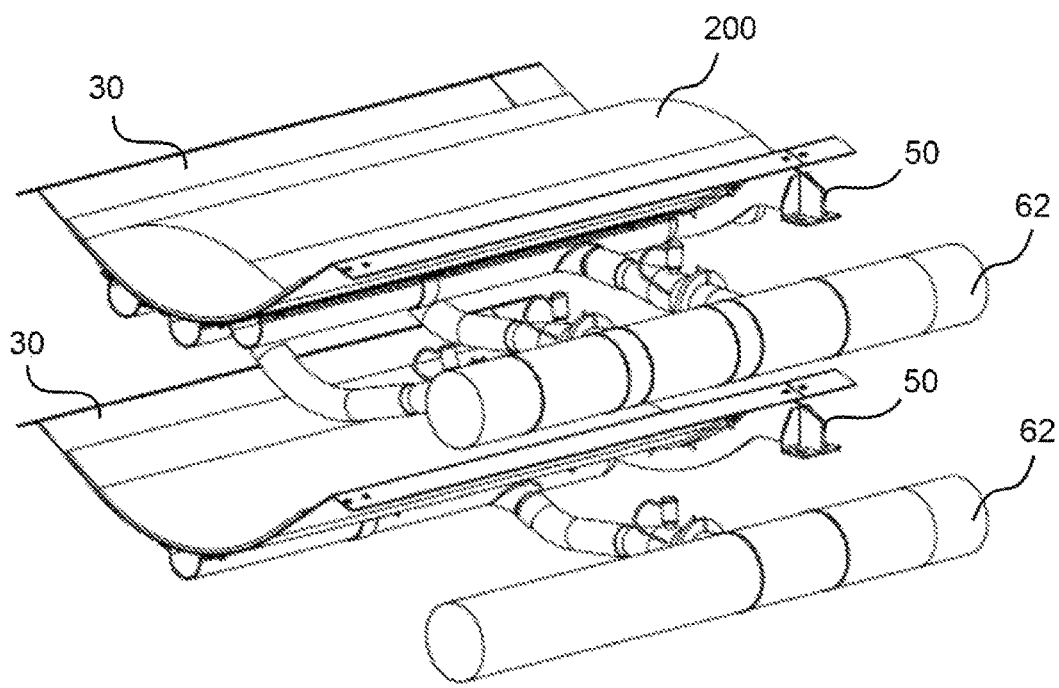
Figure 4F:
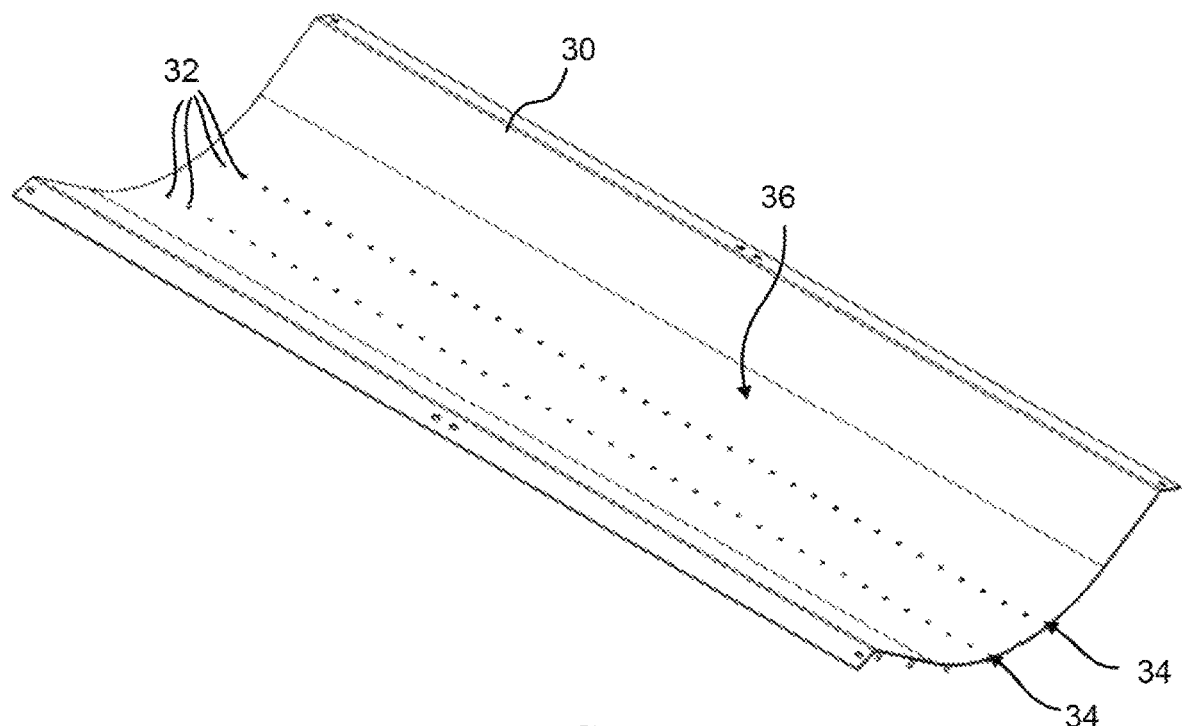
FIG. 4F is an isolated, top perspective view of an exemplary trough section having two rows of openings as disclosed herein.
Figure 5A:
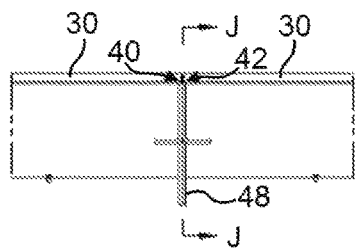
FIGS. 5A-5F depict exemplary trough-alignment elements as disclosed herein.
Figure 5B:
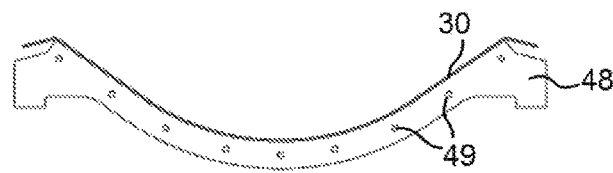
Figure 5C:
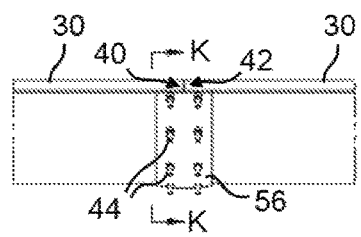
Figure 5D:
Figure 5E:
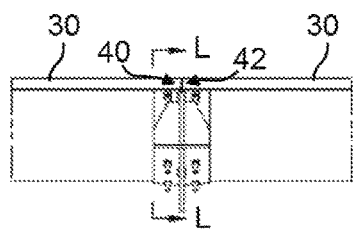
Figure 5F:
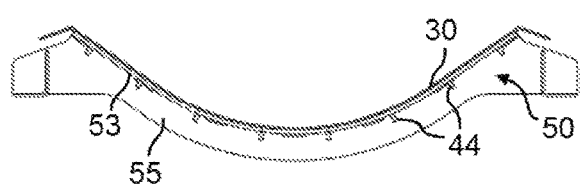

Optionally, in exemplary aspects, and with reference to FIG. 2I and FIG. 4F, the at least one opening 32 of each trough section 30 can comprise a plurality of openings. Optionally, as further described herein, at least a portion of the openings 32 can be spaced along the longitudinal length of the conveyor belt 20. For example, in one optional aspect, and as shown in FIG. 2I, it is contemplated that the plurality of openings 32 can be organized into a single row 34 of openings.

Optionally, in further exemplary aspects, at least one trough section 30 comprises at least one opening 32 that is positioned in fluid communication with a first air manifold 64a of the plurality of the air manifolds and at least one opening that is positioned in fluid communication with a second air manifold 64b of the plurality of the air manifolds.

Optionally, as shown in FIG. 4D, the first air manifold 64a and the second air manifold 64b can be spaced apart relative to the transverse axis 16, which is perpendicular or substantially perpendicular to the longitudinal axis 12 of the air-supported belt conveyor system 10. Optionally, in another aspect, the first air manifold 64a and the second air manifold 64b can be oriented parallel or substantially parallel to the longitudinal axis 12 of the air-supported belt conveyor system 10.

Optionally, in exemplary aspects, and with reference to FIG. 4F, the plurality of openings 32 of at least one trough section 30 can comprise at least two rows 34 of at least one opening, with the at least two rows being spaced apart relative to the transverse axis 16. Optionally, it is contemplated that the at least one opening of each row 34 of the at least two rows of at least one trough section 30 can comprise a plurality of openings spaced apart relative to the longitudinal axis 12. In exemplary aspects, and with reference to FIG. 4D, the first row of at least one opening of a first trough section 30a can be positioned in fluid communication with a first manifold 64a of the plurality of manifolds, and the second row of at least one opening of the first trough section 30a can be positioned in fluid communication with a second manifold 64b of the plurality of manifolds. In these aspects, it is further contemplated that the first row of at least one opening of a second trough section 30b can be positioned in fluid communication with a third manifold 64c of the plurality of manifolds. It is still further contemplated that the second row of at least one opening of the second trough section 30b can be positioned in fluid communication with a fourth manifold 64d of the plurality of manifolds. Although each manifold 64 is depicted as being in fluid communication with a respective row of openings, it is contemplated that at least one manifold can be in fluid communication with a plurality of rows 34 of openings. Optionally, it is contemplated that each trough section 30 can define a plurality of rows 34 of openings, and a single manifold 64 can be in fluid communication with each of the rows of openings within the trough section.

Optionally, rather than being spaced apart relative to the transverse axis 16, the first air manifold 64a and the second air manifold 64b (and the third and fourth manifolds 64c, 64d) can be spaced apart relative to the longitudinal axis 12 of the air-supported belt conveyor system 10.

In further exemplary aspects, each manifold 64 can be removably secured to a bottom surface 38 of a respective trough section 30. In these aspects, and as shown in FIGS. 2E and 2G, each manifold 64 can be removably secured to the bottom surface 38 of a respective trough section 30 using a plurality of reusable fasteners 80, such as, for example and without limitation, bolts, screws, clamps (e.g., spring clamps), latches, huck fasteners, cotter pins, and the like.

In still further exemplary aspects, it is contemplated that each manifold 64 can comprise non-metallic materials, including, for example and without limitation, acrylonitrile butadiene styrene (ABS), fiberglass, a fiber-reinforced polymer (FRP), a thermoplastic polyolefin (TPO), thermoformed plastic, injection molded plastic, hybrid materials comprising any two materials (including metallic and non-metallic materials), or combinations thereof.

In further exemplary aspects, and with reference to FIGS. 2A-5F, the sequential (adjacent) trough sections 30 can be coupled together at respective joints 46. In these aspects, each trough section 30 can have opposed first and second end edges 40, 42, and the plurality of trough sections 30 can be coupled together at a plurality of joints 46 that are not in fluid communication with the manifolds 64. Optionally, the end edges 40, 42 of sequential trough sections 30 of the plurality of trough sections can abut one another. In exemplary aspects, at least one of the plurality of joints does not comprise an air-tight connection. Optionally, in these aspects, each of the joints 46 does not comprise an air-tight connection.

In some aspects, and with reference to FIGS. 2A-5F and 10A-10B, the system can further comprise a plurality of trough-alignment elements, such as, for example and without limitation, a saddle 50, a flange 48, or a band 56 as further described herein. In these aspects, each trough-alignment element can be positioned at a respective joint 46 between sequential trough sections 30, and each trough-alignment element can effect alignment between inner surfaces (e.g., adjacent end edges) of the sequential trough sections relative to the longitudinal axis 12.

Optionally, as shown in FIGS. 2A-2H, FIGS. 4A-4E, and 5E-5F, the plurality of trough-alignment elements can comprise at least one saddle 50 (optionally, a plurality of saddles 50). In exemplary aspects, each saddle can have an upper surface 52 with a shape that is complementary to a shape of the lower surfaces 38 of sequential trough sections 30. In these aspects, the upper surface 52 of each saddle 50 can effect alignment between the sequential trough sections 30 relative to the longitudinal axis. In further aspects, the system 10 can further comprise a plurality of fasteners 44. In these aspects, each fastener 44 can be configured to secure a trough section 30 to a saddle 50 at a respective joint 46. Exemplary fasteners 44 include bolts, screws, pins (e.g., cotter pins), rods, clamps (e.g., spring clamps), latches, huck fasteners, and the like. In additional aspects, each saddle 50 can define a plurality of through-openings 54 extending generally perpendicular to the upper surface 52 of the saddle (from the upper surface to an opposed lower surface of the saddle). In these aspects, each through-opening 54 of the saddle 50 can be configured to receive a fastener 44 that secures one of the sequential trough sections 30 to the saddle.

In exemplary aspects, each of the sequential trough sections 30 can have opposed end portions (that define the opposed end edges 40, 42) that are spaced apart relative to the longitudinal axis 12. In these aspects, each end portion of each trough section 30 can comprise a plurality of fasteners 44 that are secured to the trough section. Optionally, the fasteners 44 can be permanently secured to the trough section. Optionally, the fasteners 44 can be integrally formed with the trough section as a monolithic component. In such configurations, the fasteners 44 can optionally be provided as projections that are integrally formed with the trough section. In further aspects, and with reference to FIGS. 10A-10B, the plurality of through-openings of each saddle 50 can comprise: a first plurality of through-openings 54 that are configured for alignment with the plurality of fasteners 44 of a first end portion of first trough section 30; and a second plurality of through-openings 54 that are configured for alignment with the plurality of fasteners 44 of a second end portion of a second trough section 30. In exemplary aspects, each saddle can comprise a platform 53 having the plurality of through-openings 54 defined therein, and a panel 55 extending downwardly from the platform and being configured for connection to the truss 15 or other support structure.

Optionally, at least one of the joints 46 between respective trough sections 30 can comprise first and second fasteners of different types. Optionally, it is further contemplated that at least one of the joints 46 between respective trough sections 30 can comprise at least one fastener 44 and at least one weld.

In use, the plurality of fasteners 44 at each joint 46 can be configured to position the lower surface 38 of each trough section 30 in contact with the upper surface 52 of a corresponding saddle 50. In exemplary aspects, it is contemplated that each trough section 30 can comprise a flexible material as further disclosed herein, and each saddle 50 can be configured to impart a corresponding shape to an overlying trough section. Exemplary flexible materials include, for example and without limitation, ultrahigh molecular weight (UHMW) materials, formed or molded plastic, fiberglass, sheet metal, or combinations thereof.

In other exemplary aspects, the plurality of trough-alignment elements can comprise at least one band 56 (optionally, a plurality of bands). In these aspects, each band 56 can be configured for positioning underneath the adjacent end edges of respective trough sections 30 at a respective joint 46 such that the band spans across the joint. Each band can be secured to the bottom surfaces 38 of the trough sections 30 at a corresponding joint 46 using a securing mechanism selected from the group consisting of at least one bolt, at least one screw, at least one clamp, at least one pin (e.g., at least one cotter pin), at least one latch, at least one huck fastener, welding, and combinations thereof. In exemplary aspects, each band 56 can have an upper surface with a shape that is complementary to a shape of the lower surfaces 38 of sequential trough sections 30. In these aspects, the upper surface of each band 56 can effect alignment between the sequential trough sections 30 relative to the longitudinal axis. It is further contemplated that each band 56 can comprise through-openings that are configured to receive the fasteners 44 of the trough sections 30 in the same manner described above with respect to the saddle 50.

In still further exemplary aspects, and with reference to FIGS. 3A-3F, the plurality of trough-alignment elements can comprise a plurality of flange elements 48, with each flange element defining respective ledge portions for engaging and aligning adjacent corners of sequential trough sections 30. Each flange element 48 can further comprise a transverse panel that defines a plurality of openings 49 for receiving fasteners to help secure or couple sequential trough sections 30 together.

In further exemplary aspects, it is contemplated that the plurality of trough-alignment elements can comprise at least two different types of trough-alignment elements. For example, in some aspects, the plurality of trough-alignment elements can comprise at least one saddle 50 and at least one band 56. As another example, the plurality of trough-alignment elements can comprise at least one saddle 50 and at least one flange element 48. As a further example, the plurality of trough-alignment elements can comprise at least one band 56 and at least one flange element 48.

In further exemplary aspects, and with reference to FIGS. 6A-7B, the plurality of trough sections 30 can comprise at least one curved trough section (optionally, a plurality of curved trough sections positioned sequentially along the length of the conveyor belt 20). As further described herein, each curved trough section can be formed to have a curvilinear profile within a reference plane 18. Optionally, when a plurality of curved trough sections are provided, at least a portion of the plurality of curved trough sections 30 can be positioned in sequence to define a curvature of at least a portion of the air-supported belt conveyor. In various aspects, it is contemplated that each trough section can comprise a moldable non-ferrous material. Optionally, in these aspects, the moldable non-ferrous material can be a polymer, such as, for example, a reinforced polymer. Optionally, in other aspects, the moldable material can comprise fiberglass. Optionally, in further aspects, each trough section can comprise a metallic material.

Figure 6A:
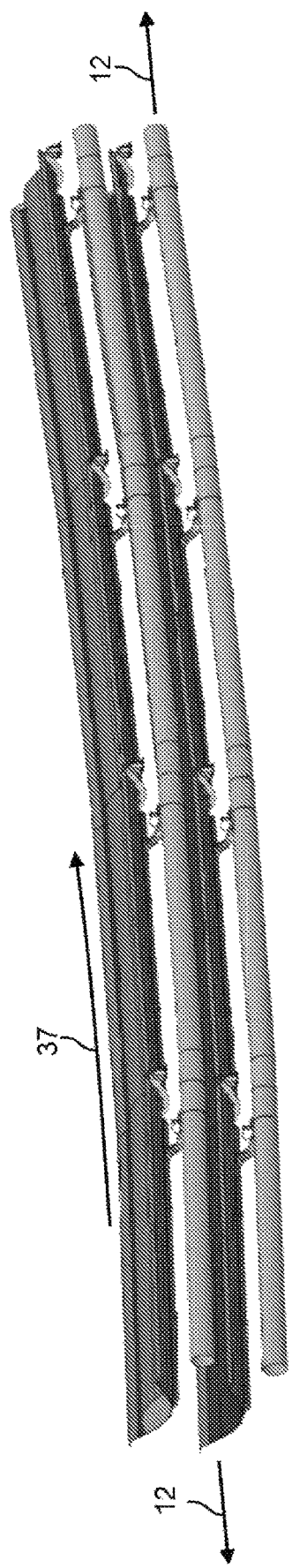
FIGS. 6A-6B provide side perspective and side elevational views of an exemplary air-supported belt conveyor system having trough sections with an upward curvature.
Figure 6B:
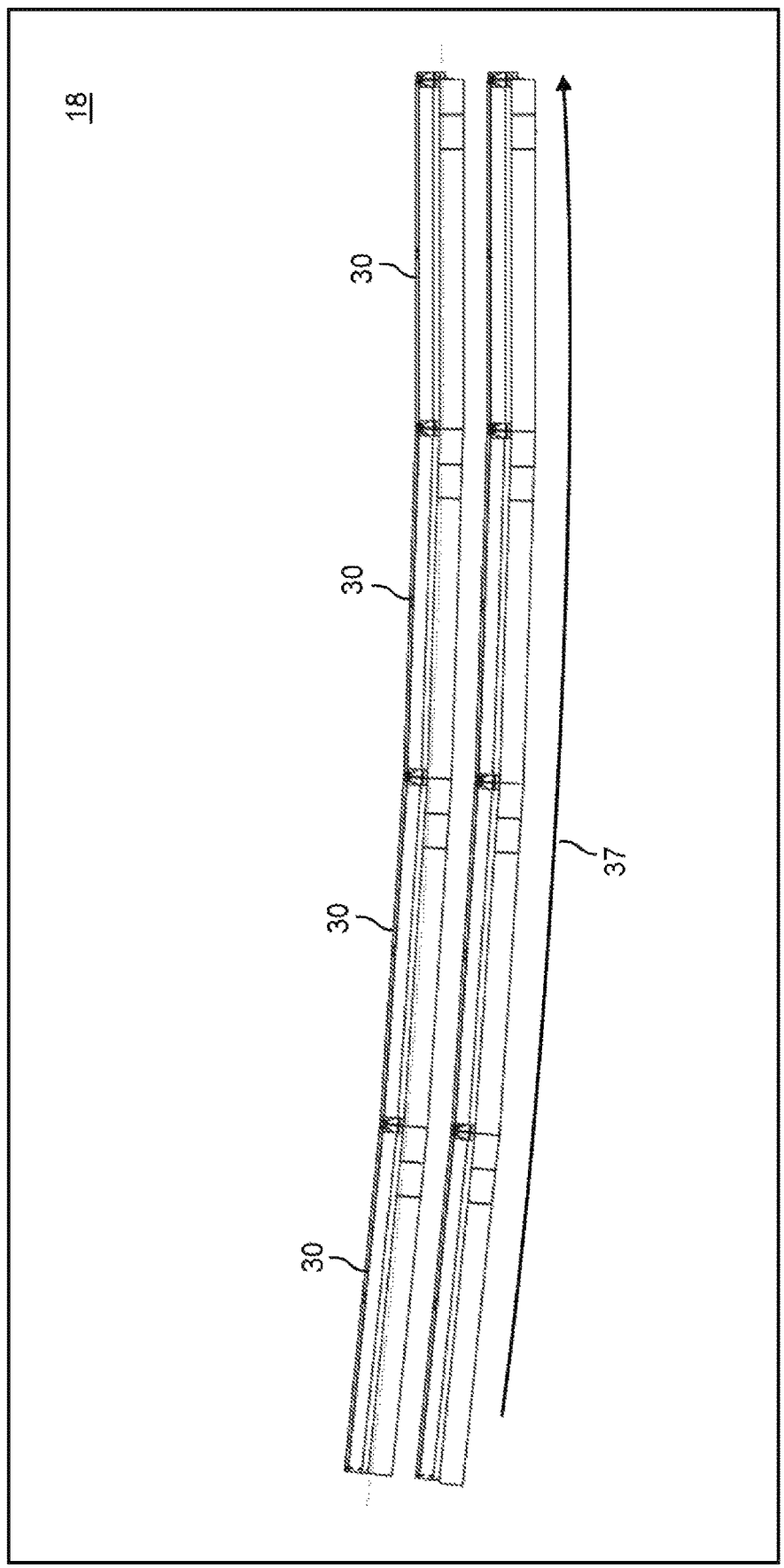
Figure 7A:
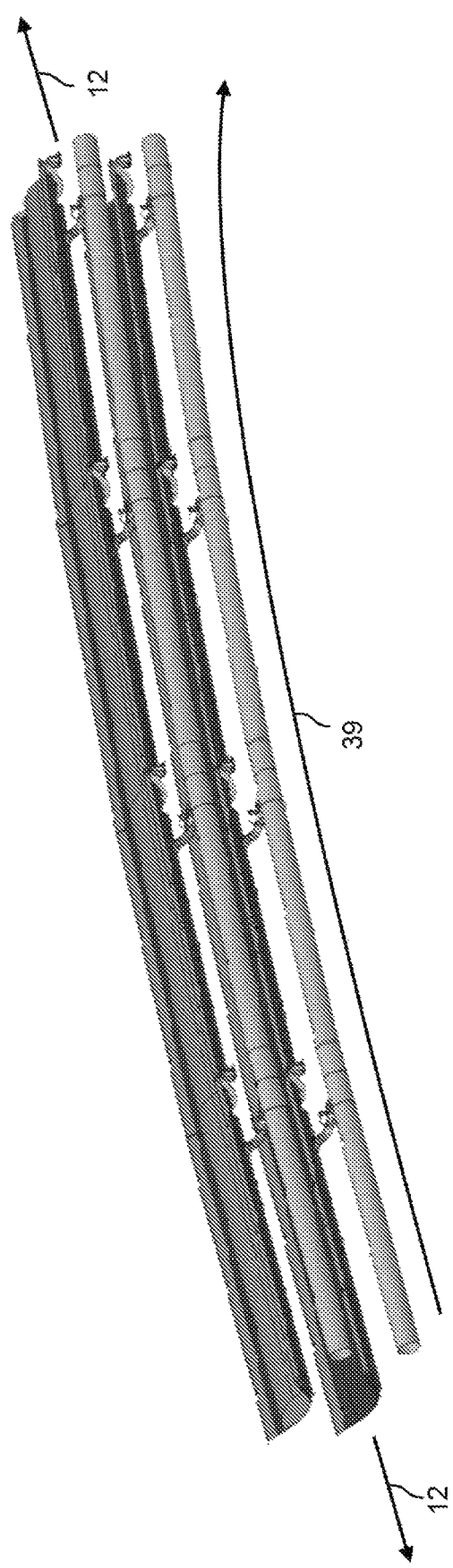
FIGS. 7A-7B provide side perspective and side elevational views of an exemplary air-supported belt conveyor system having trough sections with a downward curvature.
Figure 7B:
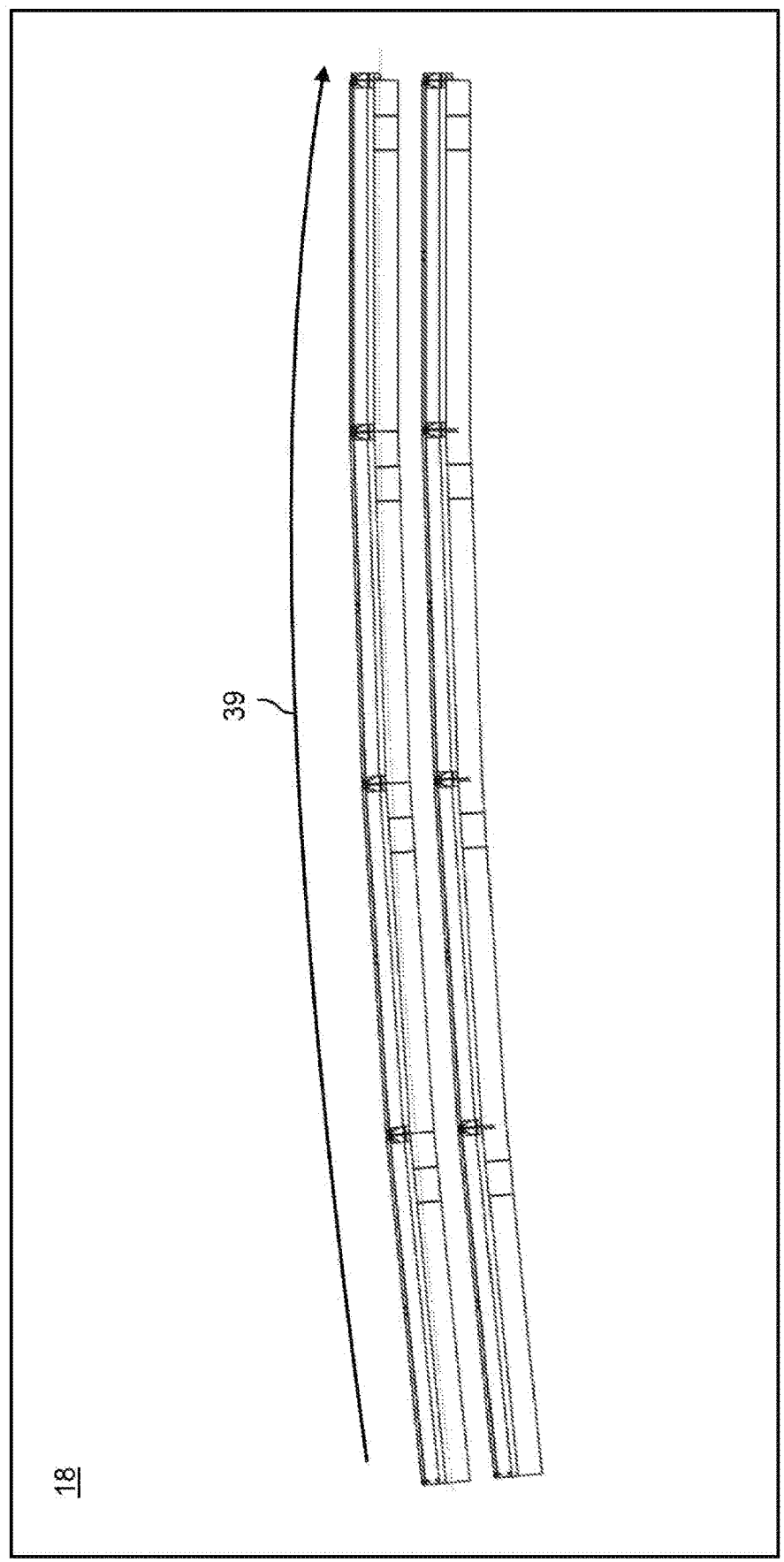

In exemplary aspects, and with reference to FIGS. 6A-6B, the reference plane 18 can be a longitudinal reference plane that is parallel to (or contains) the longitudinal axis 12 and the vertical axis 14, and at least one curved trough section 30 (optionally, two sequential curved trough sections 30) can have a curvilinear profile within the longitudinal reference plane. For example, the curvilinear profile of the at least one curved trough section (optionally, the at least two sequential curved trough sections) can comprise an upward curve within the longitudinal reference plane 18, and the at least one curved trough section (optionally, the at least two sequential curved trough sections) can define an upward curve 37 of a portion of the air-supported belt conveyor. As another example, as shown in FIGS. 7A-7B, the curvilinear profile of the at least one curved trough section (optionally, the at least two sequential curved trough sections) can comprise a downward curve within the longitudinal reference plane 18, and the at least one curved trough section (optionally, the at least two sequential curved trough sections) can define a downward curve 39 of a portion of the air-supported belt conveyor. Optionally, regardless of whether an upward curve or a downward curve is formed, the at least one curved trough section (optionally, the at least two sequential trough sections) can be shaped such that, within the longitudinal reference plane 18, the conveyor belt 20 and the at least one curved trough section (optionally, the two sequential trough sections) can have a common center of curvature. In exemplary aspects, the term "curvilinear" can refer to a cross-sectional profile in which an intermediate curved portion of the cross-section is positioned between linear (planar) portions of the cross-section that are positioned on opposite sides of the curved portion relative to the transverse axis 16.

Figure 8A:
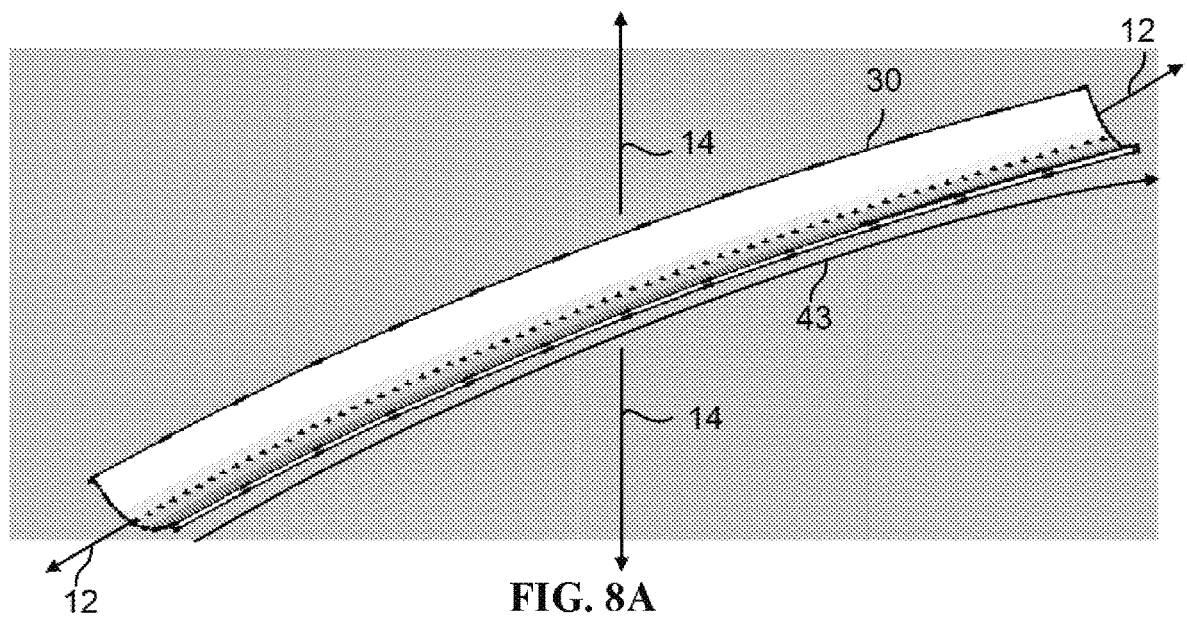
FIGS. 8A-8B provide side perspective and top perspective views of an exemplary trough section having a horizontal curvature.
Figure 8B:
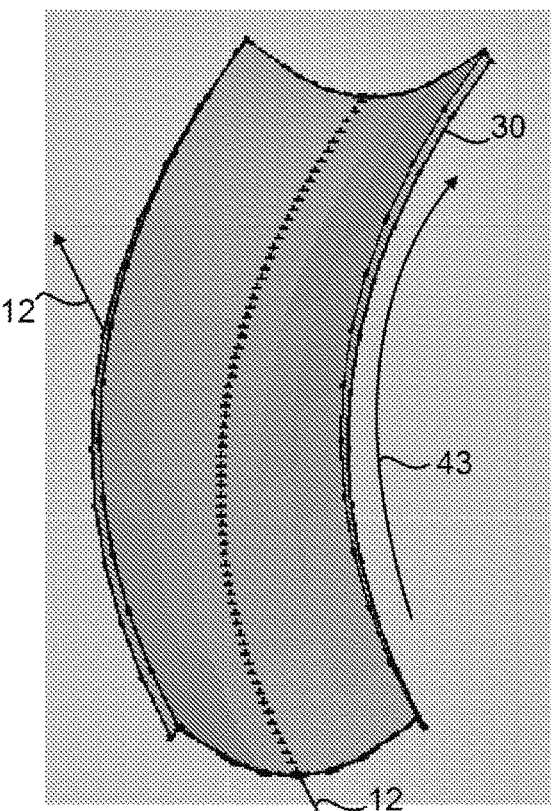
Figure 9:
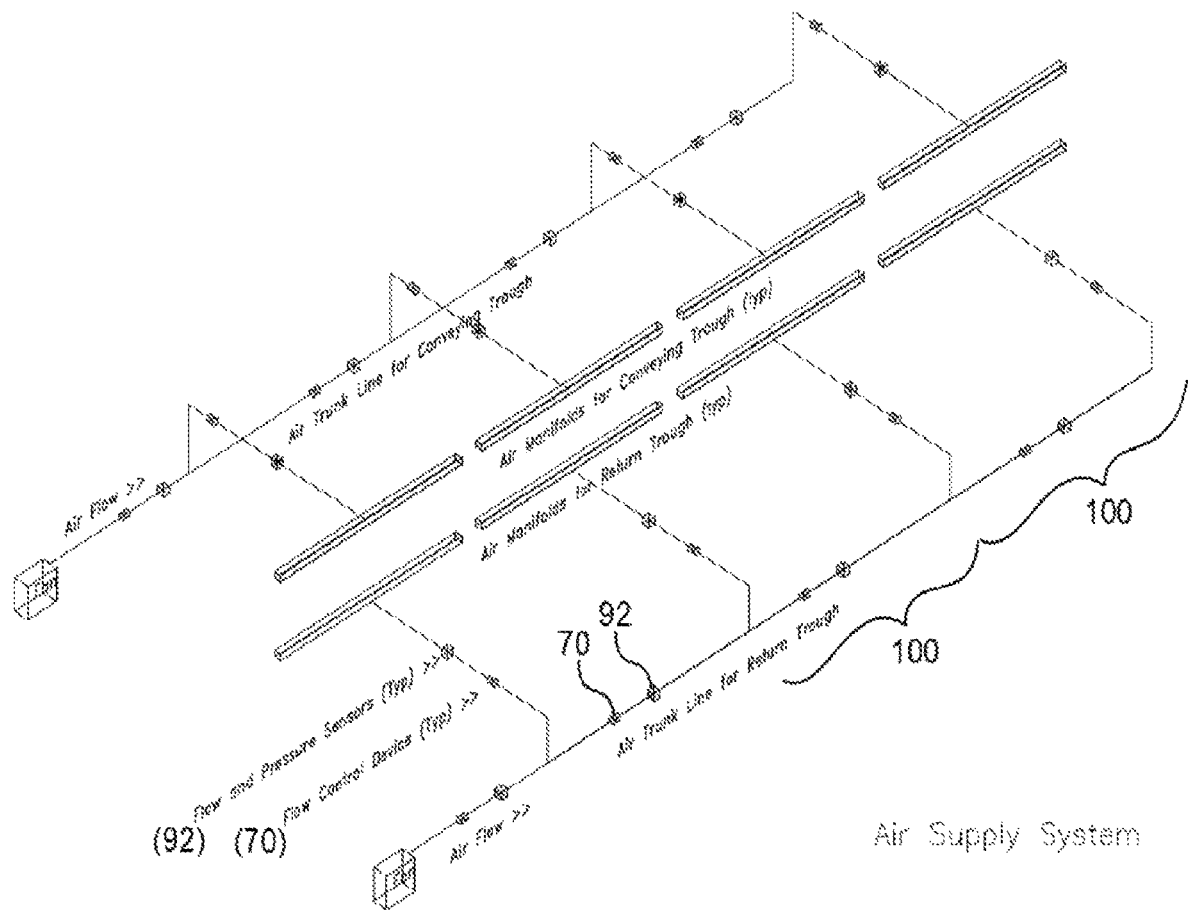
FIG. 9 is a schematic diagram depicting an exemplary air supply subsystem for an air-supported belt conveyor system as disclosed herein.
Figures 10A, 10B:
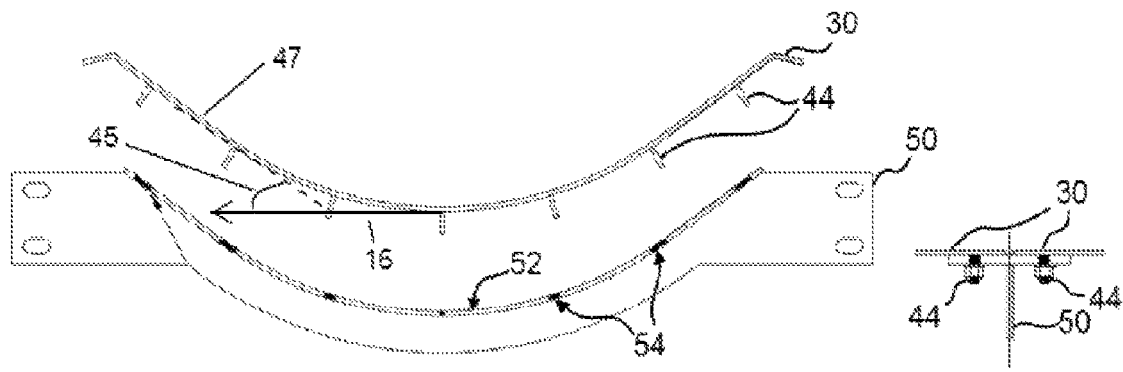
FIG. 10A is an exploded cross-sectional end view of an exemplary joint where a saddle connects two trough sections.
FIG. 10B is a cross-sectional side view showing the joint of FIG. 8A.

Optionally, in still further aspects, and with reference to FIGS. 8A-8B, the reference plane 18 can be a transverse reference plane that is perpendicular to the vertical axis 14. In these aspects, at least one curved trough section 30 (optionally, at least two sequential curved trough sections) can have a curved or curvilinear profile within the transverse reference plane, thereby producing a horizontal curve 43. Optionally, it is contemplated that the at least one curved trough section (optionally, the at least two sequential trough sections) can be shaped such that, within the transverse reference plane, the conveyor belt and the at least one curved trough section (optionally, the at least two sequential trough sections) have a common center of curvature. As further disclosed herein, the trough sections 30 do are not welded together, and they do not form a part of the rigid supporting structure (e.g., trusses) of the conveyor system. Therefore, it is contemplated that each individual trough section 30 can be formed using any suitable method and in any desired shape. Exemplary methods of forming the disclosed trough sections include press-forming, heat-treatment, and the like.

Methods of making trough sections having curved or curvilinear cross-sections as disclosed herein can comprise bending at least one trough section to form the curvilinear cross-section. In exemplary aspects, and with reference to FIG. 13, a method of constructing an upward or downward curve as disclosed herein can comprise defining a plurality of notches (or slits) 31 into the top portions of the opposed side walls of a trough section. In these aspects, the notches can be spaced along the length of the trough section and can be configured to reduce the effective section modulus about a bending axis (for forming the upward or downward curvature). In further aspects, it is contemplated that the section modulus of the manifold 64 can be increased to allow the more flexible trough sections to be pulled to the manifold and then attached to the manifold to form the desired curvature.

Alternatively, or additionally, methods of making trough sections having curvilinear cross-sections as disclosed herein can comprise molding a non-ferrous material to form at least one curved trough section. In exemplary aspects, a method of constructing a curved trough section can comprise extruding molten polymer on a mandrel to form a cylindrical pipe. The method can further comprise forming longitudinal slits into the cylindrical pipe to form trough sections. While the formed trough sections are hot, the trough sections can be laid into a jig having a desired curvature. The method can further comprise allowing the trough sections to cool within the jig, thereby ensuring the trough section retains the desired curvature.

Figure 12A:
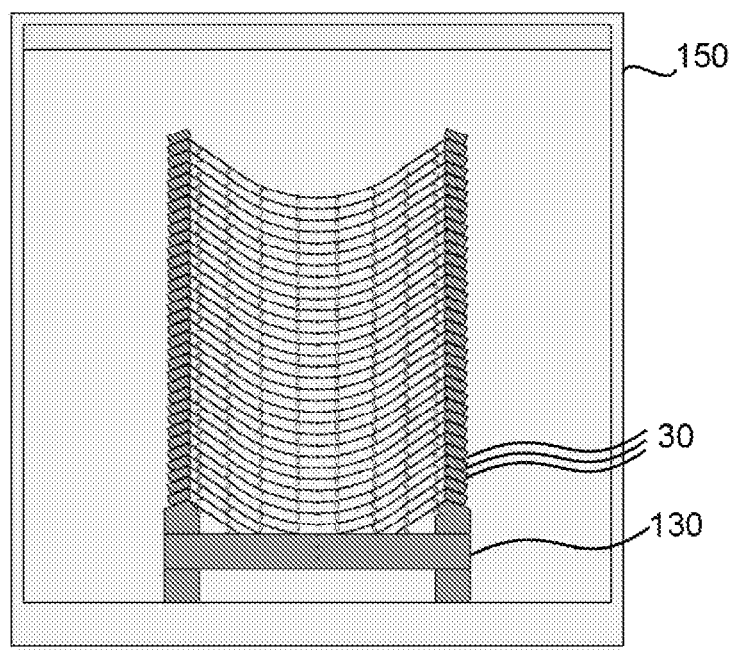
FIG. 12A is an end view depicting a nested arrangement of a plurality of trough sections for modularized transport within a shipping container as disclosed herein.
Figure 12B:
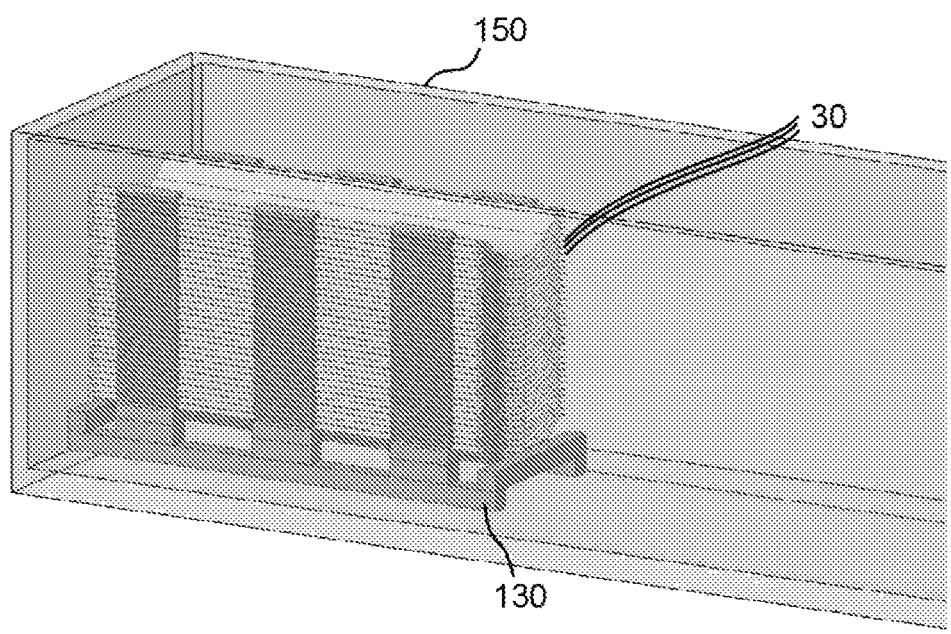
FIG. 12B is a partially transparent side perspective view of the shipping container depicted in FIG. 12A.
Figure 12C:
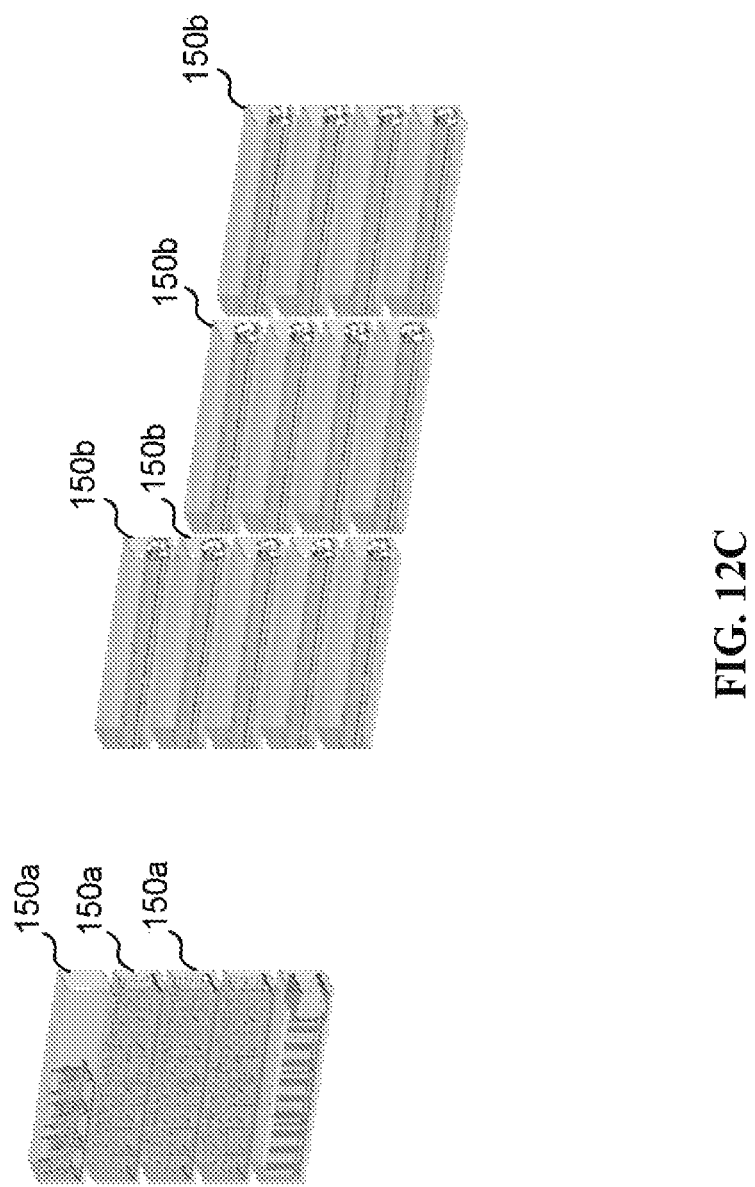
FIG. 12C is a schematic diagram depicting the reduction in the number of shipping containers required to transport a belt conveyor system using the nested arrangement depicted in FIG. 12A.
Figure 13:
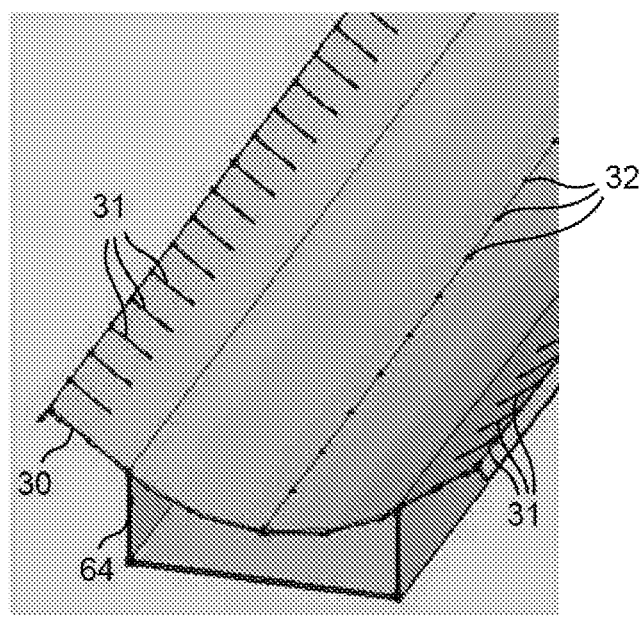
FIG. 13 is a top perspective view of an exemplary trough section having longitudinal notches or slits as disclosed herein.

In further exemplary aspects, a kit for assembling the disclosed air-supported belt conveyor systems can be provided. In these aspects, each trough section can have opposing first and second ends and opposing lower and upper surfaces and define at least one opening. Each end of each trough section of the plurality of trough sections can be configured for selective coupling to the end of another trough section. As further disclosed herein, the plurality of trough sections can be configured to cooperate to support the conveyor belt along a length of the conveyor belt. It is further contemplated that each manifold of the plurality of manifolds can be selectively attachable to the lower surface of a respective trough section such that the manifold is in fluid communication with at least one opening of the trough section. Optionally, the kit can further comprise a plurality of trough-alignment elements as disclosed herein. As further described herein, each trough-alignment element can be configured for selective positioning at a respective joint between sequential trough sections, and each trough-alignment element can have an upper surface that is configured to effect alignment between the sequential trough sections relative to the length of the conveyor belt. Optionally, the kit can further comprise a plurality of fasteners configured to selectively secure the plurality of manifolds to the plurality of trough sections. Optionally, as shown in FIGS. 12A-12B, the trough sections can be provided in a nested configuration in which a plurality of trough sections are aligned relative to the vertical axis 14, with each trough section (apart from the lowest trough section) being at least partially received within an underlying trough section. To assist in supporting the trough sections 30 in the nested configuration, it is contemplated that a sled 130 or other support structure can be positioned underneath the trough sections such that the sled 130 can be selectively moved during transport to effect movement of all of the nested trough sections. It is contemplated that the trough sections can be positioned in the nested configuration within a shipping container 150. As shown in FIG. 12C, it is further contemplated that the positioning of the trough sections in the nested configuration can greatly reduce shipping costs and flexibility during transport of the components of an air-supported belt conveyor system as disclosed herein. In particular, FIG. 12C schematically depicts a typical number of shipping containers 150a needed to ship a complete conveyor system as disclosed herein in comparison to a minimal number of shipping containers 150b needed to ship a conventional conveyor system. Optionally, the kit can further comprise at least one air supply line and ducting elements for use in assembling the air delivery subsystem. The kit can further comprise a plurality of branch conduits 63 where required. The kit can still further comprise covers 120 that are configured for placement over respective trough sections as shown in FIG. 1A.

After the kit is received, an air-supported belt conveyor can be assembled. For example, a method of assembling the air-supported belt conveyor can comprise: receiving the kit; selectively coupling the ends of the plurality of trough sections; and selectively attaching at least one manifold of the plurality of manifolds to each respective trough section.

Trough Materials

In exemplary aspects, disclosed herein are trough sections that are formed from flexible and/or non-conventional materials. It is contemplated that these trough sections can be used in any known belt conveyor configuration, including those specifically disclosed herein. In some aspects, the trough sections can comprise flexible (i.e., non-rigid) materials that cooperate to define a trough. In these aspects, it is contemplated that the trough can support the belt. In further aspects, it is contemplated that the trough can shape the belt. In use, it is contemplated that a film of air can be injected between the belt and trough, providing a frictionless substitute for conventional rollers. Conventional systems utilize various forms of rigid structural troughs, usually made of steel. In exemplary aspects and with reference to FIG. 11, the present disclosure, however, can comprise flexible trough sections suspended between rigid structural elements lying on each side of, above, and equidistant from the belt which can lie in and slide along the trough. In these aspects, the trough can follow the shape of the structural elements which can be straight or curvilinear. Thus, unlike conventional systems having a series of trough sections that are welded together along the length of the conveyor system, the disclosed trough sections can have any desired shape or profile and can be formed of flexible (non-rigid) materials to permit such flexibility. It is contemplated that the described arrangement can be utilized for either the belt that is transporting material or the empty return belt. In further aspects, the trough can comprise non-rigid (flexible) materials including, for example and without limitation, polyethylene, polypropylene, fiberglass, UHMW polyethylene, or other composites. In one optional aspect, it is contemplated that the belt can be supported by an air film. Alternatively, in other optional aspects, it is contemplated that the belt can slide directly on the non-rigid trough.

In further exemplary aspects, it is contemplated that the trough sections disclosed herein can comprise alternative trough materials. As described herein, conventional systems utilize various forms of rigid structural troughs, usually made of steel or steel-lined with a low friction material. In exemplary aspects, the trough of the present disclosure, however, can comprise polyethylene, polypropylene, UHMW, or any other manmade material with or without reinforcement. It is contemplated that such an arrangement can be utilized for either the belt that is transporting material or the empty return belt. In these aspects, the belt can be either supported by an air film or slide directly on the non-metallic trough.

In one aspect, it is contemplated that a trough comprising alternative materials can be molded to incorporate air channels (manifolds) and holes as disclosed herein. In another aspect, a trough composed of alternative materials can be more flexible than steel sections and can be bent to match the curvature of the conveyor. In further aspects, supported by steel framework, the more flexible alternative trough material can be made to conform without changing in cross-section. Current technology requires that curves be approximate by a series of straight chords, which compromise the uniformity of the air film due to irregularity of the distance between the belt and chords through the curve. It is contemplated that a curved trough, rather than a series of straight chords, can ensure a uniform air film along the length of the curve.

In one exemplary aspect, the flexible nature of the flexible trough can allow it to conform to the belt under changing load conditions. In this aspect, it is contemplated that by matching the contour of the belt, the relationship between the belt and trough can allow a more uniform film of air to be distributed between them, thereby improving the air bearing.

In another exemplary aspect, the flexible trough can allow simple replacement of worn or damaged trough sections. In a further aspect, the flexible trough can enable cost-effective use of lower friction trough materials. In another aspect, it is contemplated that the flexible trough can be easily replaceable when damaged or worn.

In another exemplary aspect, the flexible trough can comprise material that can present lower frictional resistance and require lower power to move the belt in the trough. In this aspect, the lower friction material can enable the option of sliding the belt on the surface without air suspension.

In another exemplary aspect, the flexible trough can inhibit the buildup of material that tends to cake on surfaces by breaking the bond by flexing. In further aspects, the flexible trough can be shaped by its structural supports to follow curvilinear horizontal and vertical paths which can be both beneficial and necessary in material handling.

Air Supply System

As described above, the disclosed system can make use of an air delivery subsystem that does not require a continuous air chamber along the length of the conveyor. In contrast, conventional designs utilize continuous air plenum chambers that span the entire length under the belt and are formed from steel and bolted or welded, thus, becoming an integral part of the structure. Such conventional designs have blowers that create a positive pressure in the plenum chamber and air escapes through a series of holes under the belt. Referring to FIGS. 1A-4F, in exemplary aspects, air can be supplied to the conveyor through a system that is separate from the conveyor structure both physically and functionally. In these aspects, the separate air supply system can comprise a trunk line having branches that can distribute air to the trough section. In further aspects, it is contemplated that the branches can be modular. In these aspects, the branches can be monitored and controlled separately to ensure proper distribution of air under the belt.

It is contemplated that the air supply system can enable more scientific analysis and design of the air distribution network from the demand at each hole or cluster of holes to the supply at the blower. In these aspects, each section can be sized for the actual requirement at that point in the conveyor. In further aspects, it is contemplated that the air supply system can separate the air network from the structure, thereby allowing for increased optimization and reduced costs for both the structure and the air network due to more efficient use of materials. In still further aspects, it is contemplated that the air supply system can enable finite monitoring and control of flow and pressure throughout the air-supported belt conveyor.

It is contemplated that the air supply system disclosed herein can provide several advantages over conventional systems and methods, including without limitation, simplifying troubleshooting due to a more accessible air supply network; allowing for easy replacement, repair, and retrofitting; simplifying manufacturing and installation of trough sections by eliminating the need for air-tight joints where one section joins another; allowing for the incorporation of smart controls to increase or decrease air at discrete points along the conveyor beltline as conditions change (e.g. during starting, the loaded section of the belt can advance from the tail); and simplifying the monitoring and cleaning of air supply ports.

It is contemplated that the disclosed air supply system can be used with any trough section arrangement. For example, the disclosed air supply system would work with trough sections that are connected together in any known manner or that are formed of any known material. Thus, the use of the disclosed air supply system is not limited to the specific, preferred embodiments disclosed herein.

Automatic Flow Adjustment Valves for Sensing and Controlling Air Pressure and/or Flow In exemplary aspects, and with reference to FIGS. 1A-4F and 9, it is contemplated that the air-supported belt conveyor can comprise automatic flow adjustment valves. In these aspects, the air-supported belt conveyor can employ airflow under the belt to lift and support the belt as it moves through a fixed trough. In further aspects, the airflow can be locally sensed and changed as the load in the trough changes, thereby providing more lift when the belt is loaded, and less lift when there is no load on the belt. In further aspects, the flow adjustment valves can be either spring-loaded, mechanically-activated devices or electro-mechanical valves activated by an electronic switch. In further aspects, the electronic switches can be load cells or load-sensitive devices. Optionally, the flow adjustment valves can be activated by a device on the structure without direct exposure to the air chamber or belt. It is contemplated that the flow adjustment valves can allow for discrete computer controlled air flow.

With an air supply system that can employ incrementally spaced branches from a trunk line along the length of the conveyor to modular trough sections, as described herein, it is contemplated that the flow adjustment valves can be utilized at selected modules that sense a change in load and accordingly change airflow in specific trough sections. In these aspects, sensors can increase airflow in advance of the load by increasing flow further down the line. In further aspects, the valves can be integrated with the conveyor electronic control system and controlled by logic to alter the flow in specific locations as determined by the design. In these aspects, it is contemplated that the valves can be stand-alone or wired to the conveyor control system for more finite control. It is further contemplated that stand-alone devices can be load-dependent without logic. In exemplary aspects, trough sections can comprise circular, parabolic, or catenary arcs, with or without tangential planar sides, in cross-section to transport bulk materials efficiently. In these aspects, since adjacent trough sections can be closely aligned, movement can be limited and a lever-type multiplier can be needed to activate the valves.

It is contemplated that such automatic flow adjustment valves, as described herein, can provide several advantages over conventional systems and methods. Loaded and empty belts can require different airflow. Too much airflow under an empty belt can cause instability, and too little airflow may not lift a loaded belt from the surface; either too much airflow or too little airflow can require more tractive power to overcome friction. Air can be adjusted to a single load condition such as the unloaded return belt, but the transport section of belt can be sometimes loaded and sometimes not. It is contemplated that the automatic flow adjustment valves described herein or computer logic written for the purpose can enable airflow to adjust to that change as the load moves up the belt from the charging station.

Start-up of new conveyors can exhibit conditions not seen after a conveyor has run for a period of time. Such conditions can require more power than can later be required after the system is adjusted, tuned, and worn. The disclosed automatic flow adjustment valves provide finite control over the air distribution system which can aid in the early starting of the system. Such demand-driven control of airflow can have the effect of most efficiently distributing air where it is needed.

Air Supply Manifolds

Conventional designs utilize continuous air plenum chambers that span the entire length under the belt and are formed from steel and welded, thus, becoming an integral part of the structure. Such conventional designs have blowers that create a positive pressure in the plenum chamber and air escapes through a series of holes under the belt.

In exemplary aspects, and with reference to FIGS. 2A-4E, the modular manifold systems disclosed herein can provide a means to distribute air incrementally along the length of a conveyor. In these aspects, a trunk line can be designed to transport the air efficiently to modular manifolds placed incrementally along the length that perform the distribution function. It is contemplated that, together with a pipe network, modular manifolds can enable incremental monitoring and adjustment of airflow. In exemplary aspects, it is contemplated that the manifolds can comprise any length. More practically, however, the manifolds can be from about 10 to about 20 feet in length, or equal or substantially equal to the length of the support trough and thus avoiding costly air-tight connections between trough sections. In further aspects, the modular manifolds can be manufactured in standard lengths incorporating efficient directional airflow turns and joints to reduce fan requirements. In still further aspects, the modular manifolds can comprise cleanout ports or attached with quick disconnect capability to allow local inspection and flushing by air or water. It is contemplated that the modular manifolds can be easily inspected, cleaned, and replaced.

In further exemplary aspects, it is contemplated that a air delivery subsystem as disclosed herein can be used to distribute air along the length of the conveyor. In these aspects, the air delivery subsystem can comprise a trunk line that can be fed by one or more fans with branches spaced along the length of the conveyor system that can supply air to manifolds that are in fluid communication with the openings of each trough section. Branch spacing and the manifold cross-section can be optimized based on various factors. It is contemplated that the use of such configurations can provide significant cost advantages in comparison to conventional systems.

It is contemplated that the air supply system disclosed herein can provide several advantages over conventional systems and methods, including without limitation, simplifying the manufacturing and installation of trough sections by eliminating the need for air-tight joints where one section joins another; allowing for the incorporation of smart controls to increase or decrease air flow at discrete points along the conveyor beltline as conditions change (e.g. during starting, the loaded section of the belt can advance from the tail); and simplifying the monitoring and cleaning of air supply ports.

Air-Supported Horizontal Curve

In exemplary aspects, as described above, the air-supported belt conveyors and systems disclosed herein can incorporate horizontal curves. In optional aspects, but without limitation, it is contemplated that the horizontal curves can be circular curves that are circular (have a constant radius of curvature) in reference to the belt work line. It is contemplated, however, that any horizontal curve can be used with the disclosed systems, including without limitation, an elliptical curve, a simple curve, or a compound curve. It is further contemplated that at least a portion of such curves can optionally correspond to a circular profile, an elliptical profile, or any other desired shape. In these aspects, in a top projection view, the conveyor can define a circular curve with a point of curvature, point of intersection, and point of tangency at the intersection of two straight sections. It is contemplated that such curvature can achieve directional change without transfer points. In these aspects, the trough can be designed to follow the horizontally curving path. In further aspects, the material can either be molded to hold the curve shape, or restrained in the desired configuration by a superstructure. In further aspects, the trough and air supply system can be designed to resist and restrain the belt normal to the resultant of gravity, the radial component of belt tension, and centrifugal forces for empty and loaded belts.

Molded Vertical and Horizontal Curve Sections

In exemplary aspects, as further described above, the systems described herein can comprise trough sections for horizontal and vertical conveyor curves that are molded in the correct curvature to maintain the desired shape. As disclosed herein, it is contemplated that any desired horizontal curve can be used with the disclosed systems, including without limitation, a simple curve, a compound curve, and a spiral curve. It is further contemplated that at least a portion of such curves can correspond to a circular profile, an elliptical profile, or any desired shape. Optionally, the horizontal curve can have a constant radius of curvature and have a circular profile. It is further contemplated that any vertical curve can be used with the disclosed systems, including without limitation, crest vertical curves and sag vertical curves. In these aspects, the trough can be designed and manufactured to follow the curve shape. In further aspects, the material can comprise polyethylene, polypropylene, fiberglass, or other reinforced or non-reinforced, non-metallic material.

Current technology requires that curves be approximated by a series of straight chords, which compromise the uniformity of the air film due to irregularity of the distance between the belt and trough chords through the curve. It is contemplated that a curved trough rather than a series of straight trough chords can ensure a uniform air film.

Clamped Air Chamber

As described herein and shown in FIGS. 2A-4E, an air-supported belt conveyor can utilize removable clamped air chambers (manifolds) that can be functionally separate, can be shipped separately, and can be easily and selectively removable for cleaning and maintenance. This is in contrast to current plenum designs, which are permanently bolted or welded and integral to the belt support structure.

In exemplary aspects, the removable air chambers can be a continuous or segmented, flat or formed, stiff or flexible, plenum, manifold, or bladder manufactured from steel, rubberized material, polymer, aluminum, or other material to suit operating conditions. In further aspects, the cross-sectional shape of the chamber can be curved or substantially curved, triangular or substantially triangular, or rectangular or substantially rectangular. It is contemplated that the cross-sectional area of the air chamber can be modified easily if so required.

In other exemplary aspects, the clamps can comprise any fabricated or manufactured device that can use a screwing action, wedging action, or a prying action or any combination thereof, to hold the air chamber securely against the belt support structure, with or without a gasket, to form an airtight seal. In some exemplary aspects, the clamps can be used to secure both edges and, where necessary, the ends of the air chamber. In further aspects, the clamps can be spaced depending on the stiffness of the clamped member or runner to ensure the airtight seal. In these aspects, the air can be fed to the chamber from the end or side, and the chamber can be partitioned along the length or continuous.

It is contemplated that such removable air chambers can be easily inspected, cleaned, and replaced. It is further contemplated that the air chamber materials can be shipped separately or bought locally for field installation.

Non Ferrous Air Chambers

In exemplary aspects, and as further described above, it is contemplated that air chambers (manifolds) of an air-supported belt conveyor can comprise non-ferrous materials, including without limitation, aluminum, plastic, fiberglass, fiber reinforced plastic, or rubber, or combinations thereof. Such materials are lighter in weight than conventionally used steel or steel-lined chambers, thereby reducing the structural loading and providing for easier maintenance. Additionally, it is contemplated that such non-ferrous materials can be less corrosive and resistant to chemicals. It is further contemplated that such non-ferrous air chambers can be manufactured in mass. In these aspects, the non-ferrous air supply chambers described herein can incorporate fittings. More particularly, the non-ferrous air supply chambers described herein can be formed to incorporate connections to air supply network and cleaning ports. In further aspects, the cross-sectional area of the air chamber can be modified easily, if required.

Modularization for Optimum Packing

Referring to FIGS. 12A-12C, freight is a major cost component in material handling equipment, and one of the few costs that can be optimized by innovative design. Moving material by belt conveyor can require the same mechanical power and support structures, which can comprise the majority of the cost and can be the same among competitors. Designing light weight systems for flat packing and optimum use of volume requires innovation that can result in a competitive advantage.

Along its length, the air-supported belt conveyor can comprise a cover, a top trough, a bottom trough (or idlers), an air supply to feed orifices aligned under each air-supported belt, and a span structure, each responsible for accomplishing a distinct function. Conventional systems utilize a monolithic design comprising a unitized body. Consequently, the structure and air system cannot be practically optimized for actual span or discrete air supply requirements and cannot be shipped economically due to the volume of the assembled unit. The present disclosure separates the component into independent systems that can be independently designed for requirements that change along the conveyor length, as well as from conveyor to conveyor. These described independent systems can be designed to occupy minimum volume when disassembled for optimal packing into containers. It is contemplated that each system can be procured from different markets selected for economic and strategic reasons, and then assembled once shipped to a common site.

In exemplary aspects, covers can be separate from the trough, removable, and can be from various materials, including but not limited to, steel, aluminum, plastic, reinforced plastic, and fiberglass. The covers can be flat stacked together using minimal volume.

In further exemplary aspects, the top trough can support the belt and convey material between cross members of the span structure or floor supported frames. In these aspects, the trough may not be part of the overall span structure, so it can be thin gauge material. In further aspects, these trough sections can be compact and designed to be stacked. In still further aspects, saddles can comprise independent members that support adjoining trough ends and serve as a part of the close tolerance connection.

In further exemplary aspects, the bottom trough can support the return belt between cross members of the span structure or floor supported frames. In these aspects, the bottom trough may not be part of the overall span structure, so it can be thin gauge material. In still further aspects, these trough sections can be compact and designed to be stacked. In even further aspects, the saddles can be designed as independent members that support adjoining trough ends and serve as a critical part of the close tolerance connection.

In further exemplary aspects, the air supply system can be composed of a trunk line fed by a fan with branches spaced along the length that supply air to channels under the line of orifices under each trough section. In these aspects, branch spacing and air manifold cross section can be optimized based on fabrication capabilities. Such items are largely commodities available in local markets, whereby freight cost is minimized.

In still further exemplary aspects, the support structure can vary along the conveyor to ensure optimal sizing. In these aspects, along floors or grade, cross supports can extend to grade. When elevated, trusses or other spanning structures can support cross frames for each trough section. Due to size and weight, it is often most economical to buy structures regionally to save freight costs.

Trough Connection

Conventional air-supported belt conveyor designs utilize a full length plenum positioned under each trough to transport air along the conveyor to orifices in the trough. One or more fans exhaust air into the plenum creating a positive pressure in the chamber, thereby forcing air to flow through the orifices, providing lift to the belt. Such designs utilize a monolithic design comprising a unitized body which must be sealed to prevent air leakage across the connection between adjacent troughs. Additionally, inner surfaces that will contact the moving belt must be carefully aligned and flush to prevent belt wear. Welding in or near the joint results in weld splatter that must be removed carefully or the adherents to the surface will quickly destroy the conveyor belt. Due to the close tolerance requirements, a high level of quality in fabrication and field assembly must be observed.

In exemplary aspects, and with reference to FIGS. 2A-4F, the present disclosure simplifies this connection by negating the need for air seal at the joint, eliminating weldment at the joint, and ensuring flush surfaces. In these aspects, the systems described herein can comprise a saddle formed to the shape of the trough. Saddles form the foundation on which trough sections are laid and then bolted or clamped. In these aspects, the saddles can span between structural supports at the end of formed trough sections. In further aspects, the trough sections can be then bolted or clamped to the saddle in a manner that aligns the inner surfaces to ensure no edges are exposed to the belt.

In exemplary aspects, the systems described herein can comprise air manifolds. In these aspects, the air supply system described herein can enable the flow of air to the orifices that create the air bearing to terminate separately from the trough sections. In these aspects, an air seal 66 (e.g., a compression seal or gasket) can be accomplished by each manifold for its respective section of trough, and the trough is connected separately.

In some exemplary aspects, the systems described herein can comprise clamping or bolting mechanisms. In these aspects, trough sections can be clamped or bolted by one of several variations depending on the size and loading of the conveyor.

In further exemplary aspects, the systems described herein can comprise expansion joints. In these aspects, the clamping mechanisms can allow for differential thermal expansion under conditions where the expansion joint is required.

Trough Configuration

Conventional air supported belt conveyors can utilize trough sections with a curved cross section, either fully circular or a curved arc. Conveying belts that are utilized for air supported conveyors have a deflected shape with increasing radii toward the outer edges, similar to that yielded by catenary equation or Bernoulli's Beam equation.

In exemplary aspects, and with reference to FIGS. 5A-5F, the systems disclosed herein can comprise a trough having flattened outer edges. More particularly, in these aspects, the trough can have planar sides. In further aspects, the trough can comprise a bottom portion having a circular profile and side portions having a planar profile. In these aspects, and with reference to FIG. 10A, the planar sides 47 can be tangent to the curvature of the bottom portion at a reference angle 45 measured relative to the transverse axis 16. It is contemplated that the reference angle 45 can be any angle less than 90 degrees (i.e., an acute angle). In exemplary aspects, a typical range of the reference angle is 20 degrees to about 45 degrees. It is contemplated that such flattening of the outer edges of the trough can decrease the belt pressure against the trough in this region to avoid edge drag against the trough, thereby reducing belt wear. It is further contemplated that a substantially U-shape defined by a curved bottom and planar section on each side can be easier to manufacture in a steel fabrication shop. It is even further contemplated that the disclosed trough configuration can be better for retrofitting conveyors having conventional roller idler sets due to better alignment.

Intermediate Supports

Figure 11:
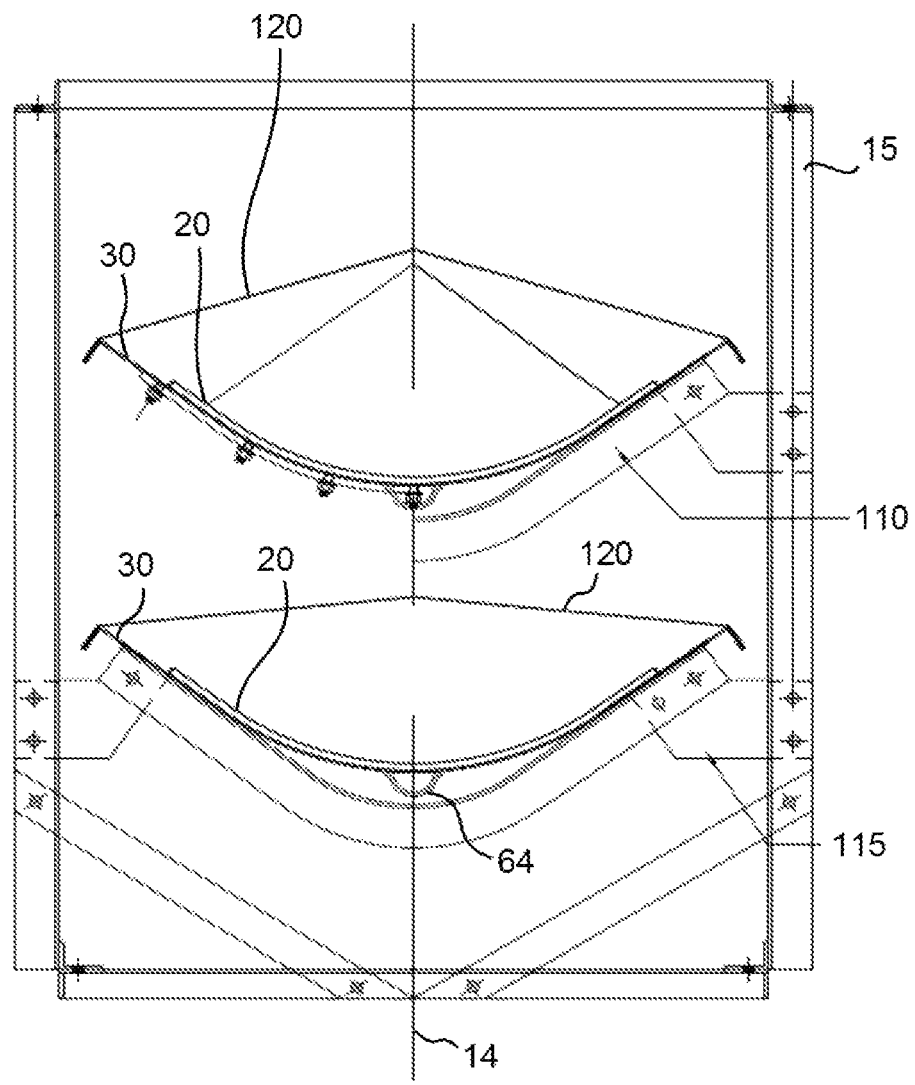
FIG. 11 is an end elevational view of an exemplary air-supported belt conveyor system having intermediate trough support structures as disclosed herein.

In exemplary aspects, and with reference to FIG. 11, it is contemplated that the system 10 can comprise intermediate supports 110 that are positioned between joints 46 of the system along the length off the system. It is contemplated that these intermediate supports 110 can receive and contact a portion of the trough sections 30 to provide additional structural support to the trough sections 30, which are not welded to the rigid structural supports of the system. In further aspects, the intermediate supports 110 can be rigidly secured to the truss 15 or other rigid structural support components using brackets 15.

Exemplary Aspects

In view of the described systems and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An air-supported belt conveyor system having a longitudinal axis and comprising: a conveyor belt having a longitudinal length and a curved cross-sectional profile; a plurality of trough sections positioned along the longitudinal length of the conveyor belt, each trough section being positioned under the conveyor belt and defining at least one opening for receiving air to support the conveyor belt above a top surface of each trough section; an air delivery subsystem comprising: at least one air supply line; and a plurality of air manifolds positioned in fluid communication with the at least one air supply line, wherein each air manifold contacts a single trough section and is in fluid communication with at least one opening of the single trough section.

Aspect 2: The system of aspect 1, wherein adjacent trough sections of the plurality of trough sections are not sealingly connected.

Aspect 3: The system of aspect 1, wherein the air delivery subsystem further comprises a plurality of flow control valves, wherein each flow control valve is positioned in fluid communication with at least one air manifold and the at least one air supply line and is configured to permit selective adjustment of air flow to the at least one air manifold from the at least one air supply line.

Aspect 4: The system of aspect 3, further comprising a processor communicatively coupled to each flow control valve and configured to adjust a position of each flow control valve to selectively control delivery of air to the at least one opening of each respective trough section through the plurality of air manifolds and thereby support the conveyor belt.

Aspect 5: The system of aspect 4, wherein the air delivery subsystem further comprises a plurality of branch conduits, wherein each branch conduit extends between the at least one air supply line and at least one air manifold.

Aspect 6: The system of aspect 5, wherein each flow control valve is positioned in fluid communication with a respective branch conduit.

Aspect 7: The system of aspect 5 or aspect 6, further comprising a plurality of sensors, wherein each sensor is positioned in fluid communication with a respective branch conduit, wherein each sensor is communicatively coupled to the processor, and wherein each sensor is selected from the group consisting of a pressure sensor, a flow sensor, and combinations thereof.

Aspect 8: The system of aspect 7, wherein each sensor is configured to produce an output indicative of a fluid pressure or flow rate within a corresponding branch conduit, and wherein the processor is configured to receive the output from the sensor and to selectively adjust air flow to the manifold positioned in fluid communication with the corresponding branch conduit.

Aspect 9: The system of aspect 8, wherein, in response to receipt of the output from the sensor positioned in fluid communication with a respective branch conduit, the processor is configured to adjust the position of the flow control valve positioned in fluid communication with the branch conduit to thereby adjust air flow to the corresponding manifold.

Aspect 10: The system of any one of aspects 1-6, wherein the at least one opening of at least one trough section comprises a plurality of openings.

Aspect 11: The system of aspect 10, wherein at least one trough section comprises at least one opening that is positioned in fluid communication with a first air manifold of the plurality of the air manifolds and at least one opening that is positioned in fluid communication with a second air manifold of the plurality of the air manifolds.

Aspect 12: The system of aspect 11, wherein the first air manifold and the second air manifold are spaced apart relative to a transverse axis that is perpendicular to the longitudinal axis of the air-supported belt conveyor system.

Aspect 13: The system of aspect 12, wherein the first air manifold and the second air manifold are oriented substantially parallel to the longitudinal axis of the air-supported belt conveyor system.

Aspect 14: The system of aspect 11, wherein the first air manifold and the second air manifold are spaced apart relative to the longitudinal axis of the air-supported belt conveyor system.

Aspect 15: The system of aspect 11, wherein the at least one opening of at least one trough section comprises a plurality of openings.

Aspect 16: The system of aspect 15, wherein the plurality of openings of at least one trough section comprises at least two rows of at least one opening, wherein the at least two rows are spaced apart relative to a transverse axis that extends across the trough section and is substantially perpendicular to the longitudinal axis.

Aspect 17: The system of aspect 16, wherein the at least one opening of each row of the at least two rows of at least one trough section comprises a plurality of openings spaced apart relative to the longitudinal axis.

Aspect 18: The system of aspect 16, wherein the first row of at least one opening of a first trough section is positioned in fluid communication with a first manifold of the plurality of manifolds, and wherein the second row of at least one opening of the first trough section is positioned in fluid communication with a second manifold of the plurality of manifolds.

Aspect 19: The system of aspect 18, wherein the first row of at least one opening of a second trough section is positioned in fluid communication with a third manifold of the plurality of manifolds, and wherein the second row of at least one opening of the second trough section is positioned in fluid communication with a fourth manifold of the plurality of manifolds.

Aspect 20: The system of any one of aspects 1-6, wherein the at least one opening of each trough section comprises a plurality of openings.

Aspect 21: The system of aspect 20, wherein the plurality of openings of each respective trough section comprises at least two rows of at least one opening, wherein the at least two rows are spaced apart relative to a transverse axis that extends across the trough section and is substantially perpendicular to the longitudinal axis.

Aspect 22: The system of aspect 21, wherein the at least one opening of each row of the at least two rows of each trough section comprises a plurality of openings spaced apart relative to the longitudinal axis.

Aspect 23: The system of aspect 21, wherein the first row of at least one opening of a first trough section is positioned in fluid communication with a first manifold of the plurality of manifolds, and wherein the second row of at least one opening of the first trough section is positioned in fluid communication with a second manifold of the plurality of manifolds.

Aspect 24: The system of aspect 23, wherein the first row of at least one opening of the second trough section is positioned in fluid communication with a third manifold of the plurality of manifolds, and wherein the second row of at least one opening of the second trough section is positioned in fluid communication with a fourth manifold of the plurality of manifolds.

Aspect 25: The system of any one of aspects 1-6, wherein each manifold is removably secured to a bottom surface of a respective trough section.

Aspect 26: The system of aspect 25, wherein each manifold is removably secured to the bottom surface of a respective trough section using a plurality of reusable fasteners.

Aspect 27: The system of any one of aspects 1-6, wherein each manifold comprises non-metallic materials.

Aspect 28: The system of aspect 1, wherein each trough section has opposed first and second end edges, wherein the plurality of trough sections are coupled together at a plurality of joints that are not in fluid communication with the air supply line, and wherein the end edges of sequential trough sections of the plurality of trough sections abut one another.

Aspect 29: The system of aspect 28, wherein at least one of the plurality of joints does not comprise an air-tight connection.

Aspect 30: The system of aspect 28, further comprising a plurality of trough-alignment elements, wherein each trough-alignment element is positioned at a respective joint between sequential trough sections, wherein each trough-alignment element effects alignment between inner surfaces of the sequential trough sections relative to the longitudinal axis.

Aspect 31: The system of aspect 30, wherein the plurality of trough-alignment elements comprise a plurality of saddles, wherein each trough section has opposing lower and upper surfaces, and wherein each saddle has an upper surface with a shape that is complementary to a shape of the lower surfaces of sequential trough sections, wherein the upper surface of each saddle effects alignment between the sequential trough sections relative to the longitudinal axis.

Aspect 32: The system of aspect 31, further comprising a plurality of fasteners, wherein each fastener is configured to secure a trough section to a saddle at a respective joint.

Aspect 33: The system of aspect 32, wherein each saddle defines a plurality of through-openings extending generally perpendicular to the upper surface of the saddle, wherein each through-opening of the saddle is configured to receive a fastener that secures one of the sequential trough sections to the saddle.

Aspect 34: The system of aspect 33, wherein each of the sequential trough sections has opposed end portions that are spaced apart relative to the longitudinal axis, wherein each end portion of each trough section comprises a plurality of fasteners that are secured to trough section, and wherein the plurality of through-openings of each saddle comprises: a first plurality of through-openings that are configured for alignment with the plurality of fasteners of a first end portion of first trough section; and a second plurality of through-openings that are configured for alignment with the plurality of fasteners of a second end portion of a second trough section.

Aspect 35: The system of aspect 32, wherein each fastener of the plurality of fasteners is selected from the group consisting of a bolt, a screw, a clamp, a pin, a rod, a latch, a huck fastener, and combinations thereof.

Aspect 36: The system of aspect 35, wherein at least one of the joints between respective trough sections comprises first and second fasteners of different types.

Aspect 37: The system of aspect 32, wherein at least one of the joints between respective trough sections comprises at least one fastener and at least one weld.

Aspect 38: The system of aspect 32, wherein the plurality of fasteners at each joint are configured to position the lower surface of each trough section in contact with the upper surface of a corresponding saddle.

Aspect 39: The system of aspect 38, wherein each trough section comprises a flexible material, and wherein each saddle is configured to impart a corresponding shape to an overlying trough section.

Aspect 40: The system of aspect 30, wherein the plurality of trough-alignment elements comprise a plurality of bands, each band being configured for positioning underneath the adjacent end edges of respective trough sections at a respective joint.

Aspect 41: The system of aspect 40, wherein each band is secured to a bottom surface of a trough section at a corresponding joint using a securing mechanism selected from the group consisting of at least one bolt, at least one screw, at least one clamp, welding, and combinations thereof.

Aspect 42: The system of aspect 1, wherein the plurality of trough sections comprises at least one curved trough section wherein each curved trough section is formed to have a curvilinear profile within a reference plane, and wherein at least a portion of each trough section defines a curvature of at least a portion of the air-supported belt conveyor.

Aspect 43: The system of aspect 42, wherein each trough section comprises a moldable non-ferrous material.

Aspect 44: The system of aspect 43, wherein the moldable material comprises a polymer.

Aspect 45: The system of aspect 44, wherein the polymer is a reinforced polymer.

Aspect 46: The system of aspect 43, wherein the moldable material comprises fiberglass.

Aspect 47: The system of aspect 42, wherein each trough section comprises a metallic material.

Aspect 48: The system of any one of aspects 42-47, wherein the reference plane is a longitudinal reference plane that is parallel to a vertical axis, and wherein at least one curved trough section has a curvilinear profile within the longitudinal reference plane.

Aspect 49: The system of aspect 48, wherein the curvilinear profile of the at least one curved trough sections comprises an upward curve within the longitudinal reference plane, and wherein the at least one curved trough section defines an upward curve of a portion of the air-supported belt conveyor.

Aspect 50: The system of aspect 48, wherein the curvilinear profile of the at least one curved trough section comprises a downward curve within the longitudinal reference plane, and wherein the at least one curved trough section defines a downward curve of a portion of the air-supported belt conveyor.

Aspect 51: The system of aspect 48, wherein the at least one curved trough section is shaped such that, within the longitudinal reference plane, the conveyor belt and the at least one trough section have a common center of curvature.

Aspect 52: The system of any one of aspects 42-47, wherein the reference plane is a transverse reference plane that is perpendicular to a vertical axis, and wherein at least one curved trough section has a curvilinear profile within the transverse reference plane.

Aspect 53: The system of aspect 52, wherein the at least one trough section is shaped such that, within the transverse reference plane, the conveyor belt and the at least one curved trough sections has a common center of curvature.

Aspect 54: The system of aspect 1, wherein the at least one air supply line comprises a primary air supply line, wherein the air delivery subsystem further comprises a plurality of flow control valves positioned in line with the primary air supply line, wherein the plurality of flow control valves divide the primary air supply line into a plurality of flow control zones, wherein at least one air manifold of the plurality of air manifolds is positioned in fluid communication with the primary air supply within each flow control zone.

Aspect 55: A method of making a trough section of the system of any one of aspects 42-47, comprising bending at least one trough section to form the curvilinear cross-section of at least one curved trough section.

Aspect 56: A method of making a trough section of the system of any one of aspects 42-47, comprising molding a non-ferrous material to form at least one curved trough section.

Aspect 57: A kit for assembling the air-supported belt conveyor system of claim 1, wherein each trough section has opposing first and second ends and opposing lower and upper surfaces and defines at least one opening; and wherein each end of each trough section of the plurality of trough sections is configured for selective coupling to the end of another trough section, wherein the plurality of trough sections are configured to cooperate to support the conveyor belt along a length of the conveyor belt, wherein each manifold of the plurality of manifolds is selectively attachable to the lower surface of a respective trough section such that the manifold is in fluid communication with at least one opening of the trough section, and wherein the trough sections are provided in a nested configuration.

Aspect 58: The kit of aspect 57, further comprising a plurality of trough-alignment elements, wherein each trough-alignment element is configured for selective positioning at a respective joint between sequential trough sections, wherein each trough-alignment element has an upper surface that is configured to effect alignment between the sequential trough sections relative to the length of the conveyor belt.

Aspect 59: The kit of aspect 57, further comprising a plurality of fasteners configured to selectively secure the plurality of manifolds to the plurality of trough sections.

Aspect 60: The kit of aspect 57, further comprising ducting elements for use in assembling the air delivery subsystem.

Aspect 61: The kit of aspect 57, further comprising covers configured for placement over respective trough sections.

Aspect 62: A method of assembling an air-supported belt conveyor, comprising: receiving a kit of any one of aspects 57-59; selectively coupling the ends of the plurality of trough sections; and selectively attaching at least one manifold of the plurality of manifolds to each respective trough section.

Aspect 63: A method of using an air-supported belt conveyor as disclosed herein.

Although the foregoing invention has been described in some detail by way of illustration and example for purposes of clarity of understanding, certain changes and modifications may be practiced within the scope of the appended claims.

What is claimed is:

1. An air-supported belt conveyor system having a longitudinal axis and comprising:
   a conveyor belt having a longitudinal length and a curved cross-sectional profile;
   a plurality of trough sections positioned along the longitudinal length of the conveyor belt, each trough section being positioned under the conveyor belt and defining at least one opening for receiving air to support the conveyor belt above a top surface of each trough section;
   an air delivery subsystem comprising:
      at least one air supply line; and
      a plurality of air manifolds positioned in fluid communication with the at least one air supply line, wherein each air manifold contacts a single trough section and is in fluid communication with at least one opening of the single trough section,
   wherein each trough section has opposed end edges, and wherein the plurality of trough sections are coupled together at a plurality of joints that are not in fluid communication with the air supply line, and wherein the end edges of sequential trough sections of the plurality of trough sections abut one another.

2. The system of claim 1, wherein adjacent trough sections of the plurality of trough sections are not sealingly connected.

3. The system of claim 1, wherein the air delivery subsystem further comprises a plurality of flow control valves, wherein each flow control valve is positioned in fluid communication with at least one air manifold and the at least one air supply line and is configured to permit selective adjustment of air flow to the at least one air manifold from the at least one air supply line.

4. The system of claim 3, further comprising a processor communicatively coupled to each flow control valve and configured to adjust a position of each flow control valve to selectively control delivery of air to the at least one opening of each respective trough section through the plurality of air manifolds and thereby support the conveyor belt.

5. The system of claim 4, wherein the air delivery subsystem further comprises a plurality of branch conduits, wherein each branch conduit extends between the at least one air supply line and at least one air manifold.

6. The system of claim 5, wherein each flow control valve is positioned in fluid communication with a respective branch conduit.

7. The system of claim 5, further comprising a plurality of sensors, wherein each sensor is positioned in fluid communication with a respective branch conduit, wherein each sensor is communicatively coupled to the processor, and wherein each sensor is selected from the group consisting of a pressure sensor, a flow sensor, and combinations thereof.

8. The system of claim 7, wherein each sensor is configured to produce an output indicative of a fluid pressure or flow rate within a corresponding branch conduit, and wherein the processor is configured to receive the output from the sensor and to selectively adjust air flow to the manifold positioned in fluid communication with the corresponding branch conduit.

9. The system of claim 8, wherein, in response to receipt of the output from the sensor positioned in fluid communication with a respective branch conduit, the processor is configured to adjust the position of the flow control valve positioned in fluid communication with the branch conduit to thereby adjust air flow to the corresponding manifold.

10. The system of claim 1, wherein the at least one opening of at least one trough section comprises a plurality of openings.

11. The system of claim 10, wherein at least one trough section comprises at least one opening that is positioned in fluid communication with a first air manifold of the plurality of the air manifolds and at least one opening that is positioned in fluid communication with a second air manifold of the plurality of the air manifolds.

12. The system of claim 1, wherein the at least one opening of each trough section comprises a plurality of openings.

13. The system of claim 1, wherein each manifold is removably secured to a bottom surface of a respective trough section.

14. The system of claim 1, wherein each manifold comprises non- metallic materials.

15. The system of claim 1, wherein at least one of the plurality of joints does not comprise an air-tight connection.

16. The system of claim 1, further comprising a plurality of trough- alignment elements, wherein each trough-alignment element is positioned at a respective joint between sequential trough sections, wherein each trough-alignment element effects alignment between inner surfaces of the sequential trough sections relative to the longitudinal axis.

17. The system of claim 16, wherein the plurality of trough-alignment elements comprise a plurality of saddles, wherein each trough section has opposing lower and upper surfaces, and wherein each saddle has an upper surface with a shape that is complementary to a shape of the lower surfaces of sequential trough sections, wherein the upper surface of each saddle effects alignment between the sequential trough sections relative to the longitudinal axis.

18. The system of claim 17, further comprising a plurality of fasteners, wherein each fastener is configured to secure a trough section to a saddle at a respective joint.

19. The system of claim 18, wherein the plurality of fasteners at each joint are configured to position the lower surface of each trough section in contact with the upper surface of a corresponding saddle.

20. The system of claim 19, wherein each trough section comprises a flexible material, and wherein each saddle is configured to impart a corresponding shape to an overlying trough section.

21. The system of claim 16, wherein the plurality of trough-alignment elements comprise a plurality of bands, each band being configured for positioning underneath the adjacent end edges of respective trough sections at a respective joint.

22. The system of claim 1, wherein the plurality of trough sections comprises at least one curved trough section wherein each curved trough section is formed to have a curvilinear profile within a reference plane, and wherein at least a portion of each trough section defines a curvature of at least a portion of the air-supported belt conveyor.

23. The system of claim 22, wherein the reference plane is a transverse reference plane that is perpendicular to a vertical axis, and wherein at least one curved trough section has a curvilinear profile within the transverse reference plane.

24. A method of making a trough section of the system of claim 22, comprising bending at least one trough section to form the curvilinear profile of at least one curved trough section.

25. A method of making a trough section of the system of claim 22, comprising molding a non-ferrous material to form at least one curved trough section.

26. The system of claim 1, wherein the at least one air supply line comprises a primary air supply line, wherein the air delivery subsystem further comprises a plurality of flow control valves positioned in line with the primary air supply line, wherein the plurality of flow control valves divide the primary air supply line into a plurality of flow control zones, wherein at least one air manifold of the plurality of air manifolds is positioned in fluid communication with the primary air supply within each flow control zone.

27. A kit for assembling an air-supported belt conveyor system, the kit comprising:
  a conveyor belt having a longitudinal length and a curved cross-sectional profile;
  a plurality of trough sections;
  an air delivery subsystem comprising:
    at least one air supply line; and
    a plurality of air manifolds configured to be positioned in fluid communication with the at least one air supply line,
  wherein each trough section has opposing first and second ends and opposing lower and upper surfaces and defines at least one opening;
  wherein each end of each trough section of the plurality of trough sections is configured for selective coupling to the end of another trough section, wherein the plurality of trough sections are configured to cooperate to support the conveyor belt along a length of the conveyor belt,
  wherein each manifold of the plurality of manifolds is selectively attachable to the lower surface of a respective trough section such that the manifold is in fluid communication with at least one opening of the trough section, and
  wherein the trough sections are provided in a nested configuration.

28. A method of assembling an air-supported belt conveyor, comprising:
  receiving a kit comprising:
    a conveyor belt having a longitudinal length and a curved cross-sectional profile;
    a plurality of trough sections, wherein the trough sections are provided in a nested configuration, and wherein each trough section has opposing first and second ends and opposing lower and upper surfaces and defines at least one opening;
    an air delivery subsystem comprising:
    at least one air supply line; and
    a plurality of air manifolds configured to be positioned in fluid communication with the at least one air supply line;
  selectively coupling the ends of the plurality of trough sections; and
  selectively attaching at least one manifold of the plurality of manifolds to the lower surface of each respective trough section,
  wherein the plurality of trough sections cooperate to support the conveyor belt along a length of the conveyor belt, and wherein each manifold of the plurality of manifolds is in fluid communication with at least one opening of a respective trough section.

29. An air-supported belt conveyor system having a longitudinal axis and comprising:
- a conveyor belt having a longitudinal length and a curved cross-sectional profile;
- a plurality of trough sections positioned along the longitudinal length of the conveyor belt, each trough section being positioned under the conveyor belt and defining at least one opening for receiving air to support the conveyor belt above a top surface of each trough section;
- an air delivery subsystem comprising:
  - at least one air supply line; and
  - a plurality of air manifolds positioned in fluid communication with the at least one air supply line, wherein each air manifold contacts a single trough section and is in fluid communication with at least one opening of the single trough section,
- wherein each manifold is removably secured to a bottom surface of a respective trough section.

30. An air-supported belt conveyor system having a longitudinal axis and comprising:
- a conveyor belt having a longitudinal length and a curved cross-sectional profile;
- a plurality of trough sections positioned along the longitudinal length of the conveyor belt, each trough section being positioned under the conveyor belt and defining at least one opening for receiving air to support the conveyor belt above a top surface of each trough section;
- an air delivery subsystem comprising:
  - at least one air supply line; and
  - a plurality of air manifolds positioned in fluid communication with the at least one air supply line, wherein each air manifold contacts a single trough section and is in fluid communication with at least one opening of the single trough section,
- wherein the at least one air supply line comprises a primary air supply line, wherein the air delivery subsystem further comprises a plurality of flow control valves positioned in line with the primary air supply line, wherein the plurality of flow control valves divide the primary air supply line into a plurality of flow control zones, wherein at least one air manifold of the plurality of air manifolds is positioned in fluid communication with the primary air supply within each flow control zone.

* * * * *